United States Patent [19]
Yoshida et al.

[11] Patent Number: 5,992,393
[45] Date of Patent: Nov. 30, 1999

[54] V TYPE DIESEL ENGINE

[75] Inventors: Kunio Yoshida; Manabu Miyazaki; Osamu Murakami, all of Osaka, Japan

[73] Assignee: Yanmar Diesel Engine Co., Ltd., Osaka, Japan

[21] Appl. No.: 08/875,932

[22] PCT Filed: Jan. 25, 1996

[86] PCT No.: PCT/JP96/00143

§ 371 Date: Aug. 22, 1997

§ 102(e) Date: Aug. 22, 1997

[87] PCT Pub. No.: WO96/24758

PCT Pub. Date: Aug. 15, 1996

[30] Foreign Application Priority Data

| Feb. 8, 1995 | [JP] | Japan | 7-020469 |
| Feb. 8, 1995 | [JP] | Japan | 7-020470 |
| Feb. 8, 1995 | [JP] | Japan | 7-020471 |
| Dec. 4, 1995 | [JP] | Japan | 7-315477 |

[51] Int. Cl.⁶ .................................................. F02M 37/04
[52] U.S. Cl. ..................... 123/509; 123/54.4; 123/149 R; 123/195 R
[58] Field of Search ................................. 123/54.4, 90.6, 123/508, 509, 198 R, 198 E, 149 R, 149 D, 195 R

[56] References Cited

U.S. PATENT DOCUMENTS

| 1,955,799 | 4/1934 | Fielden | 123/54.4 |
| 2,099,852 | 11/1937 | Knudsen | 123/54.4 |
| 2,796,057 | 6/1957 | Dolza | 123/509 |
| 2,821,969 | 2/1958 | Scheiterlein | 123/54.4 |
| 4,054,108 | 10/1977 | Gill | 123/509 |
| 4,058,092 | 11/1977 | Hikosaka et al. | 123/54.4 |
| 4,412,513 | 11/1983 | Obermayer et al. | 123/509 |
| 5,479,903 | 1/1996 | Werner et al. | 123/509 |
| 5,564,395 | 10/1996 | Moser et al. | 123/509 |

FOREIGN PATENT DOCUMENTS

| 966708 | 7/1949 | Germany . |
| 53-59132 | 5/1978 | Japan . |
| 58-6048 | 2/1983 | Japan . |
| 2-188627 | 7/1990 | Japan . |
| 6-200782 | 7/1994 | Japan . |
| 6-299862 | 10/1994 | Japan . |

*Primary Examiner*—Thomas N. Moulis
*Attorney, Agent, or Firm*—Jordan and Hamburg LLP

[57] ABSTRACT

A diesel engine having cylinders disposed in a V shape is constructed as compact as possible so that it can be adapted to either vertical and horizontal use without changing many parts. To this end, intake and exhaust cams and a fuel injection pump driving cam are disposed on a single camshaft to thereby obviate the necessity of a plurality of camshafts. In addition, a fuel pump, which has conventionally been disposed in a separate fuel injection pump case outside a cylinder block, is disposed inside the cylinder block. Furthermore, a fuel injection nozzle is disposed on an inner side of a pushrod and the pushrod and fuel injection nozzle are disposed between the cylinders, whereby a compact construction is obtained. Moreover, a governor device and a fuel injection pump are disposed on a side opposite to a crankshaft of the camshaft.

12 Claims, 30 Drawing Sheets

V TYPE DIESEL ENGINE

BACKGROUND OF THE INVENTION

The present invention relates to a V type diesel engine having cylinders disposed in a V shape as seen from a front view, which is so constructed as to be adapted to either a vertical type having a vertical crankshaft or a horizontal type having a horizontal crankshaft.

There are conventional constructions of V type diesel engines disclosed in the Japanese Laid-Open Gazette No. Hei 6-299862 and the German Patent No. 966708, for example.

The V type diesel engine in the Japanese Laid-Open Gazette No. Hei 6-299862 has a camshaft for intake and exhaust cams which are apart from a fuel injection pump. Particularly, a camshaft for the fuel injection pump driving cams is different from the camshaft for intake and exhaust cams. Accordingly, the V type diesel engine, which requires two camshafts, tends to be excessively large in the total height thereof.

In the V type diesel engine shown in the German Patent No. 966708, a single camshaft is provided for both fuel injection pump driving cams and intake and exhaust cams. However, a governor device is not disposed between cylinders which are disposed in a V shape.

SUMMARY OF THE INVENTION

According to the present invention a V type diesel engine has cylinders HL and HR disposed in a V shape as seen from a front view, and between cylinders HL and HR are disposed intake and exhaust cams 31 and fuel injection pump driving cams 30, a fuel injection pump P, a governor device G, pushrods 24 and fuel injection nozzles 26 and 27. Both intake and exhaust cams 31 and fuel injection pump driving cams 30 are disposed on a single camshaft 1 instead of two different camshafts, and fuel injection pump P and governor device G are disposed on a side opposite to a crankshaft S of camshaft 1, whereby the entire V type diesel engine has a compact form.

A starter K is disposed on one side of cylinders HL and HR and supplementary devices N are disposed on the other side thereof so that vacant spaces of recesses on both sides of a crankcase 2 can be used effectively in comparison with such a conventional construction that a starter and supplementary devices, like an operating oil pump, are concentrated in a recess on one side of a crankshaft.

Fuel injection pump driving cams 30 on camshaft 1 are disposed behind intake and exhaust cams 31 and on a side opposite to a gear case 3, and governor device G is disposed on the same side of gear case 3, so that a top of engine is lowered and a driving line of gears is simplified in comparison with a conventional construction having two camshafts disposed vertically.

Fuel injection pump P is disposed on an extending portion of a governor case A housing governor device G so as to integrate fuel injection pump P and governor device G in governor case A, thereby easing adjustment of fuel injection pump P and assembly thereof and obviating disposition of a fuel injection pump case.

Fuel injection nozzles 26 and 27 are disposed between intake and exhaust valve driving pushrods 24 which are disposed in a V-shaped bank, so that the width of engine can be smaller and both sides of cylinders are used effectively.

Starter K is disposed on one side of cylinders HL and HR and supplementary devices N are disposed on the other side thereof so that starter K and supplementary devices N are disposed, instead of projecting, respectively in recesses on both sides of the crankcase which are naturally formed in a V type diesel engine. A lubricating oil filter L is disposed on the same side with supplementary devices N, thereby compacting the entire V type diesel engine.

On a camshaft 1, fuel injection pump driving cams 30 are disposed between intake cams 31 and exhaust cams 31, fuel injection pump P is disposed above fuel injection pump driving cams 30, and governor device G is disposed on the same side of the gear case 3, so that governor device G, fuel injection pump P and a cylinder block are disposed in simple a construction.

Crankcase 2 has an opening end, gear case 3 and governor case A, which constitute an engine body, and is made by die casting to reduce cost and simplify assembly.

The interior of crankcase 2 is connected with a governor chamber m and a fuel injection pump chamber n to compact the V type diesel engine and develop lubrication thereof.

Starter K is disposed on an opening side of crankcase 2 and fuel injection pump P is disposed on close side of crankcase 2 to simplify the driving system of starter K and fuel injection pump P.

Starter K is disposed on an outside of crankcase 2 and supplement devices N are disposed on another outside thereof, thereby the V type diesel engine is smaller in width making the entirety more compact.

Crankcase 2 has one opening end and forms a recess constituting a dynamo housing space 85 on its closed end so that the V type diesel engine is smaller in length.

A fuel feed pump Q is disposed below one of cylinders HL and HR, thereby the V type diesel engine is smaller in length making the entirety more compact.

On a side opposite to crankshaft S of camshaft 1 is disposed governor device G and fuel injection pump P. Between cylinders HL and HR, disposed in a V shape are fuel injection nozzles 26 and 27. On one side of crankcase 2 is disposed starter K, and on the other side of crankcase 2 are supplement devices N, thereby the V type diesel engine is smaller in height and width so as to be compacted entirely.

DETAILED DESCRIPTION

A V type diesel engine of the present invention is classified into a horizontal type using crankshaft S horizontally and a vertical type using crankshaft S vertically. Most parts, for example, crankcase 2, are common in both the horizontal and vertical type engines. There are differences in a direction of disposition of crankshaft 2, a direction of power taking off, and a position of oil pan which is a lubricating oil sink between the two type engines, so that crankshaft S and gear case 3 of one type is slightly different in shape from those of the other. Furthermore, a kind of a machine body loaded with one type engine is different from a kind of that loaded with the other, so that a position of a radiator R of one type engine is different from that of the other type engine.

Figure 1:
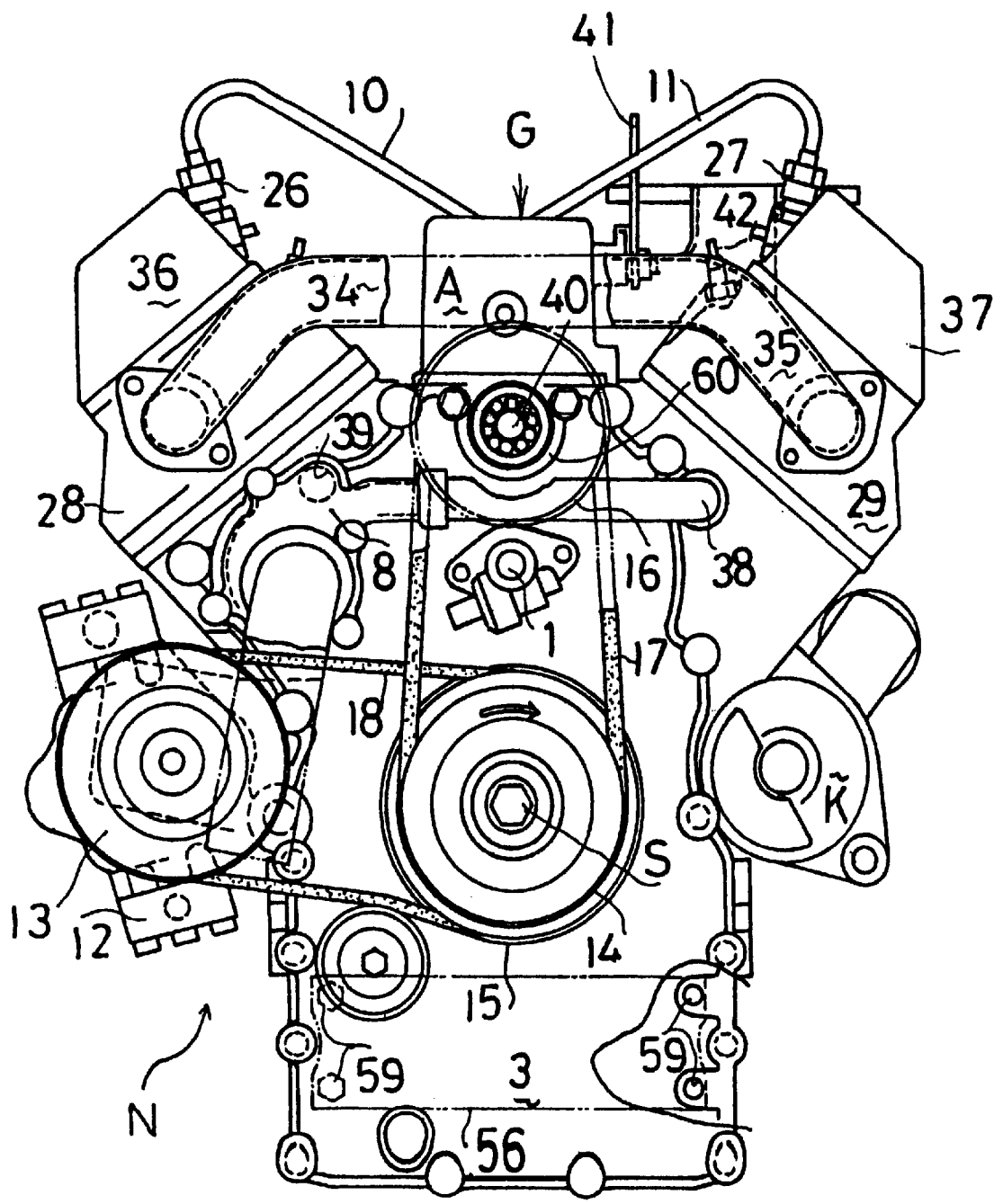
FIG. 1 is a front view of an embodiment of a V type diesel engine of a horizontal type having a horizontal crankshaft which is one type of V type diesel engines according to the present invention.
Figure 2:
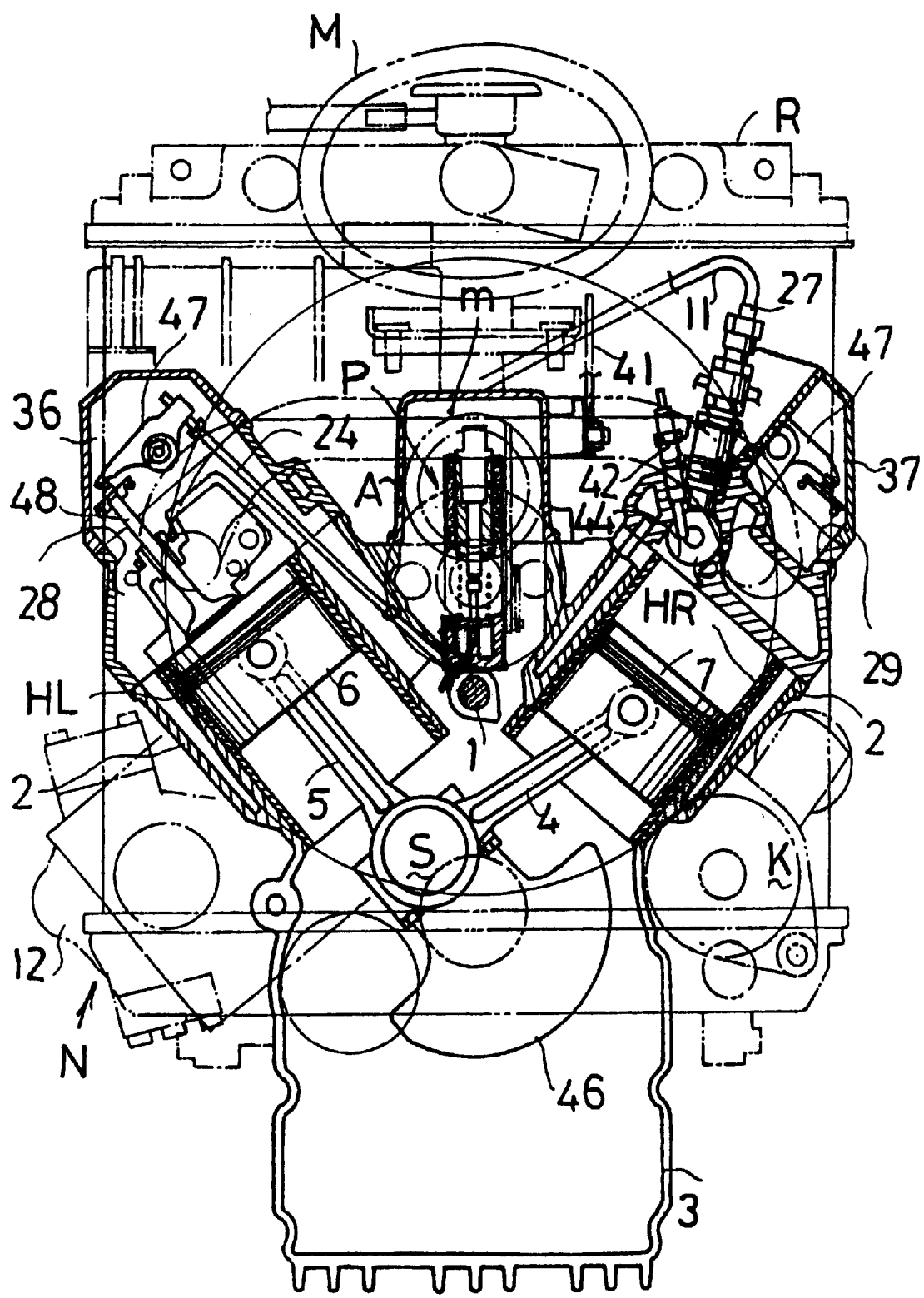
FIG. 2 is a cross-sectional front view of the embodiment of FIG. 1.

A V type diesel engine of the horizontal type is shown in FIGS. 1 to 7. FIGS. 1 shows a front of the V type diesel engine of the present invention from which radiator R is removed and FIG. 2 is a cross-sectional front view of the V type engine of FIG. 1 in which the radiator R is depicted by phantom lines. The main body of the V type diesel engine consists of crankcase 2, gear case 3 and cylinder heads 28 and 29, which are all jointed with each other. Cylinders HL and HR are integrally formed in crankcase 2.

Cylinder heads 28 and 29 are fixed respectively onto tops of cylinders HL and HR. Cylinder head covers 36 and 37 are fixed respectively onto cylinder heads 28 and 29. Fuel injection nozzles 26 and 27 are disposed respectively in cylinder heads 28 and 29.

Crankcase 2, which is made by die casting, is wide-open at a front side thereof for rapping a die. The opening portion of crankcase 2 is widened by rotation of an engine. Four screw holes 59 are tapped in the front side of crankcase 2, and a blocking member 56 is fastened onto the front side together with bolts screwed into the screw holes 59, so as to block widening of the front opening portion.

Fuel injection nozzles 26 and 27 are disposed between the cylinders 26 and 27 which are arranged in a V shape, and are fed with high-pressure fuel discharged from fuel injection pump P, which is attached to a bracket 50 constituting a rear portion of governor case A, through high-pressure fuel pipes 10 and 11.

As shown in FIG. 2, each of pushrods 24 is interposed between camshaft 1, disposed in crankcase 2, and each of intake and exhaust valve arms 47 disposed respectively in each of cylinder head covers 36 and 37.

Pushrods 24 are disposed between cylinders HL and HR. Moreover, governor case A is fixed on the top of crankcase 2 and gear case 3 between pushrods 24. Governor device G is constructed in a governor chamber m which is an interior of governor case A.

Left and right pistons 6 and 7 are slidably inserted respectively in cylinders HL and HR. Pistons 6 and 7 are connected with crankshaft S respectively through connecting rods 4 and 5. Camshaft 1 is disposed between cylinders HL and HR and is provided with intake and exhaust cams 31 and fuel injection pump driving cams 30.

Figure 7:
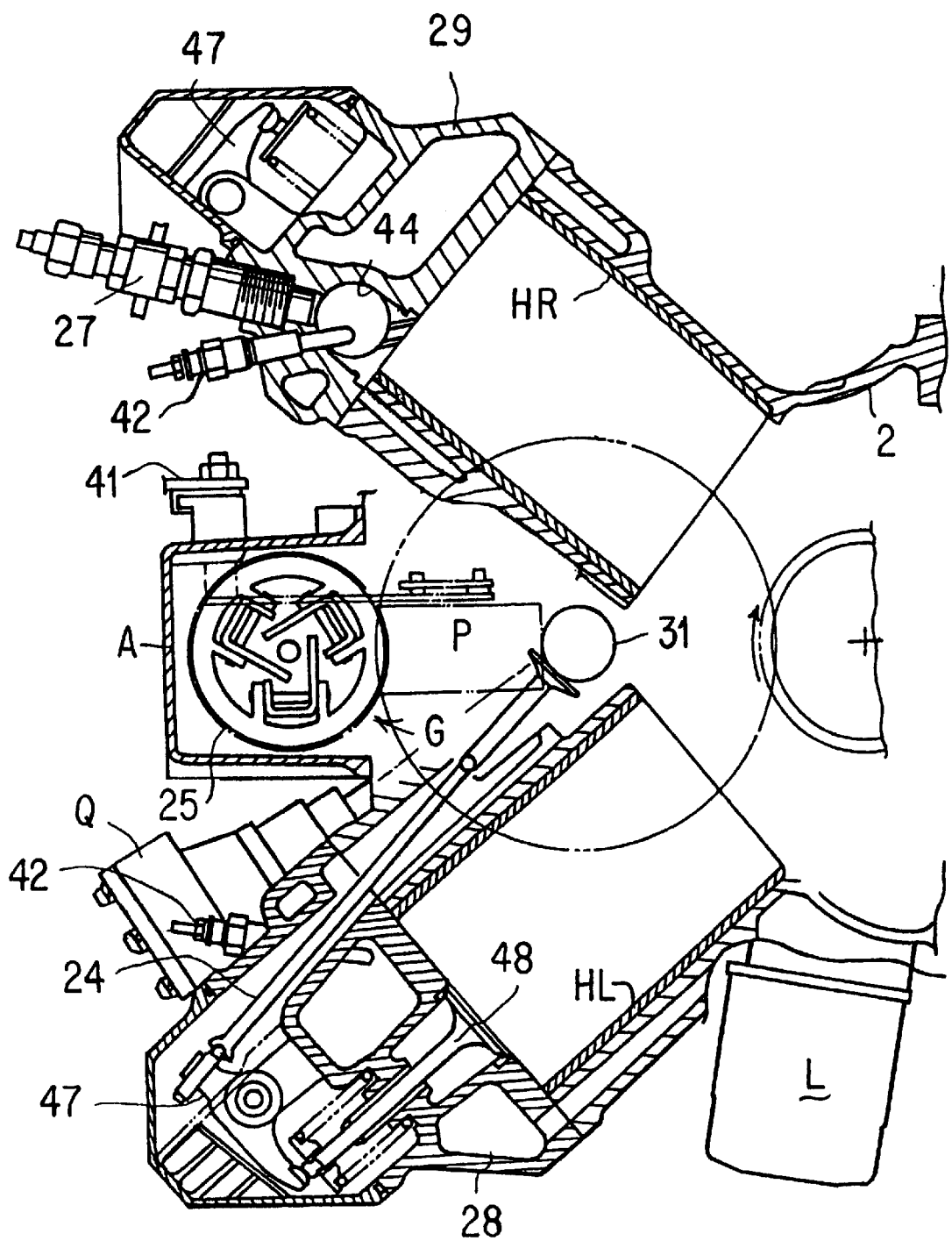
FIG. 7 is a partial cross-sectional front view of the embodiment of FIG. 1, showing cylinders HL and HR.
Figure 8:
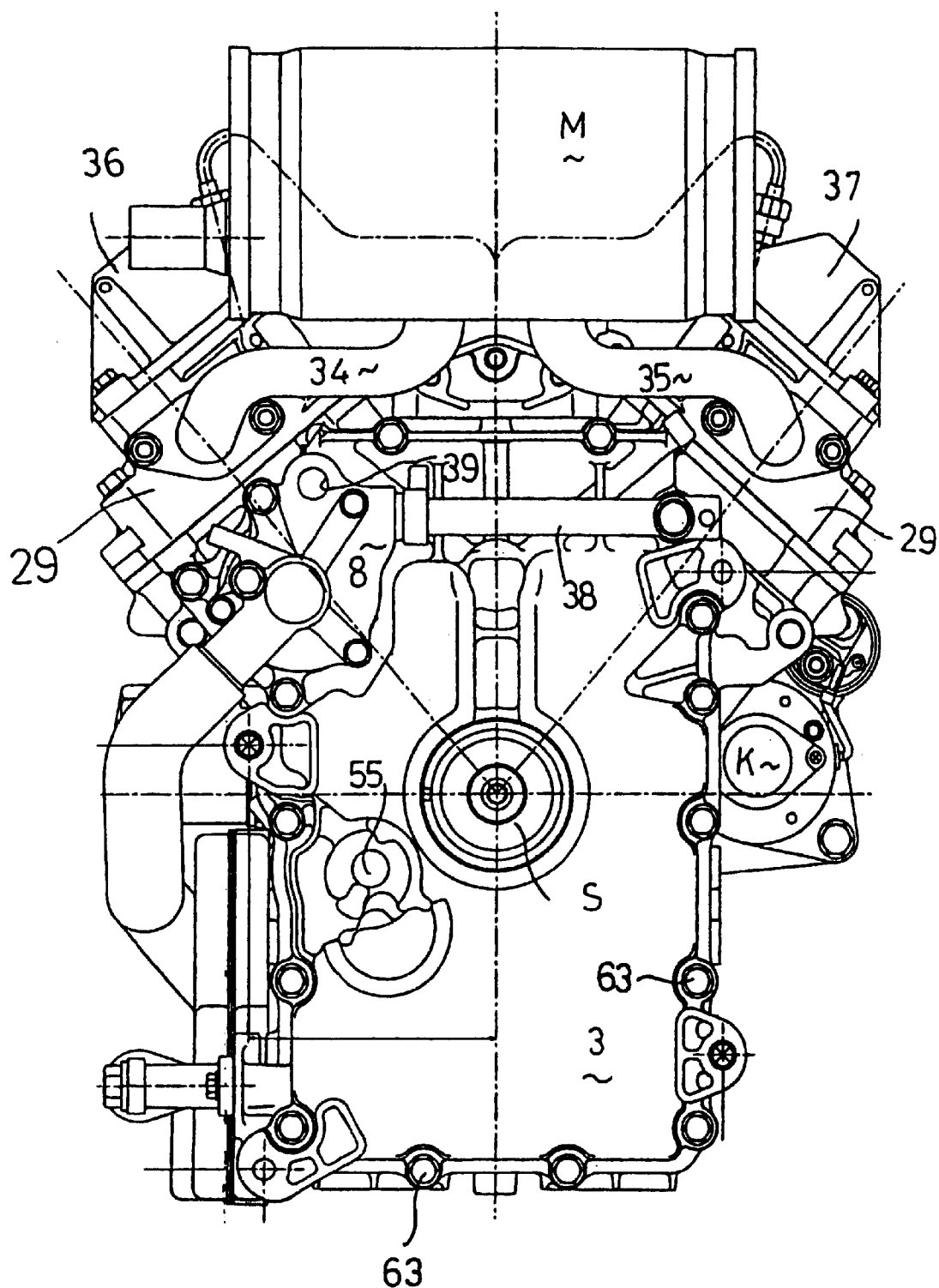
FIG. 8 is a bottom view of an embodiment of a V type diesel engine of a vertical type having a vertical crankshaft which is another type of V type diesel engines according to the present invention.

Moreover, a fuel feed pump driving cam 58 for driving fuel feed pump Q is disposed on camshaft 1 within the interior of crankcase 2. As shown in FIG. 7, a rod projects from fuel feed pump Q, disposed between cylinders HL and HR, and abuts against fuel feed pump driving cam 58 to drive fuel feed pump Q and feed fuel injection pump P with fuel.

As shown in FIG. 1, pulleys 14 and 15 are fixed onto the front end of crankshaft S projecting from gear case 3. Pulley 15 and a pulley 13 of operating oil pump 12 are connected by a belt 18. Also, pulley 14 and a pulley 16, which is fixed onto a fan shaft 40 of a radiator fan F disposed above pulley 14, are connected by a belt 17 to drive radiator fan F of radiator R.

Fan shaft 40 of radiator fan F is supported by a bearing base 60 fixed onto the front surface of gear case 3. The position of bearing base 60 is changeable in accordance with change of the position of fan shaft 40 so that positions of radiator fan F and radiator R can be changed.

The engine body is comprised of crankcase 2 and gear case 3 forms left and right recesses under both cylinders HL and HR. Starter K is disposed in the right recess and operating oil pump 12 is disposed in the left recess. A cooling water pump 8 is fixed onto the upper portion on left side of the front surface of gear case 3 and feeds cooling water to the water jacket around left cylinder HL through a cooling water hole 39 and to the water jacket around right cylinder HR through a cooling water hole 38.

Exhaust pipes 34 and 35 are interposed between the front surfaces of cylinder heads 28 and 29 and a muffler M shown in FIG. 2. With regard to the horizontal type, muffler M is disposed above the engine and radiator R is disposed in front of the engine.

A regulator lever 41 projects upwardly from governor G in governor chamber m disposed between cylinder heads 28 and 29. Ends of fuel injection nozzles 26 and 27 are screwed respectively into cylinder heads 26 and 27 and are thus inserted into a precombustor 44, and on each side thereof a glow plug 42 is fixedly inserted into precombustor 44.

FIG. 2 shows a balance weight 46 formed around crankshaft S and fuel injection pump P disposed behind governor case A. One end of each of intake and exhaust valve arms 47, which are disposed within each of cylinder head covers 36 and 37, is pushed up by each of intake and exhaust cams 31 through each of pushrods 24 so that the other end pushes each of intake and exhaust valves 48 to an open position.

Figure 3:
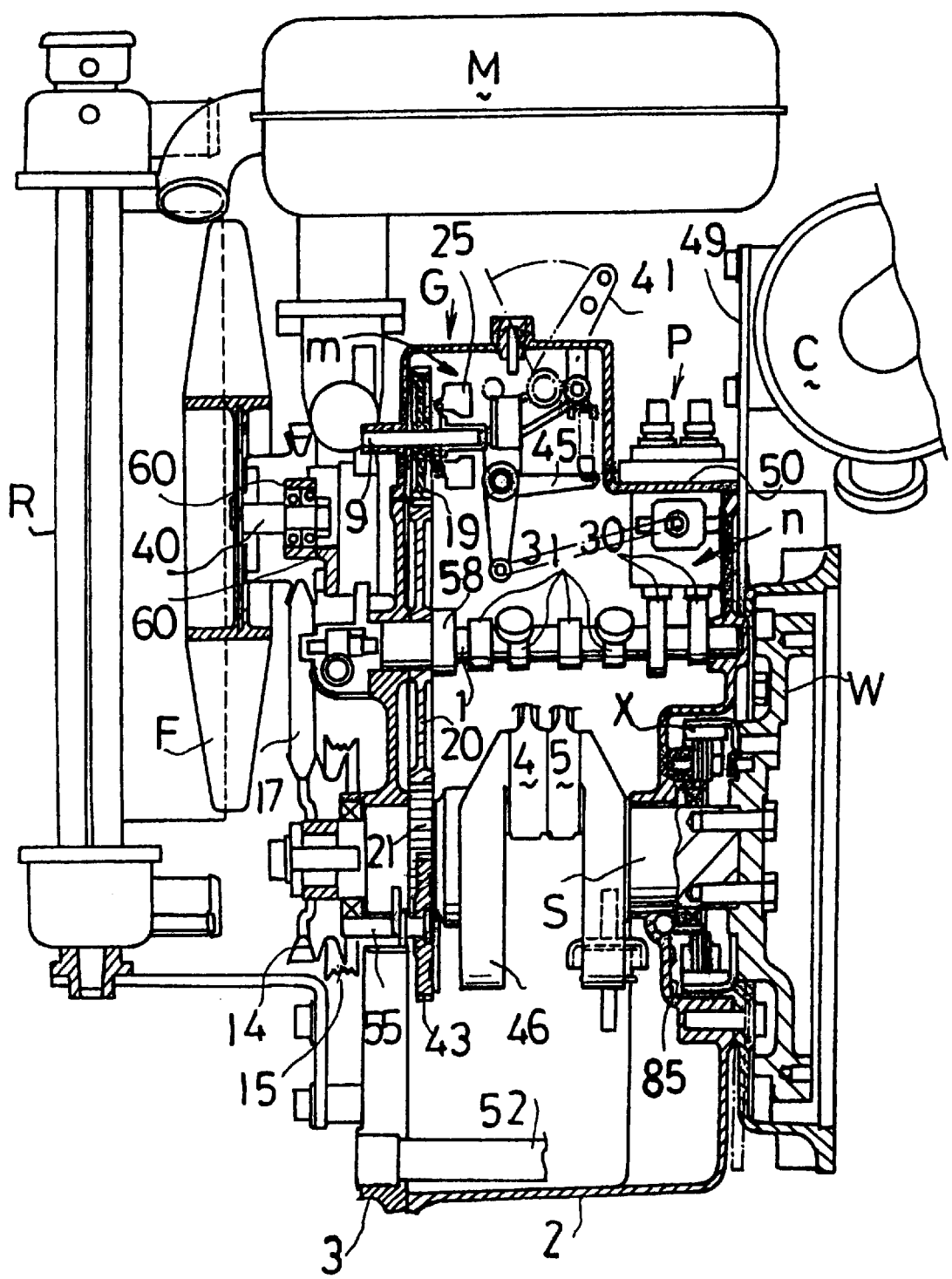
FIG. 3 is a cross-sectional right side view of the embodiment of FIG. 1.
Figure 4:
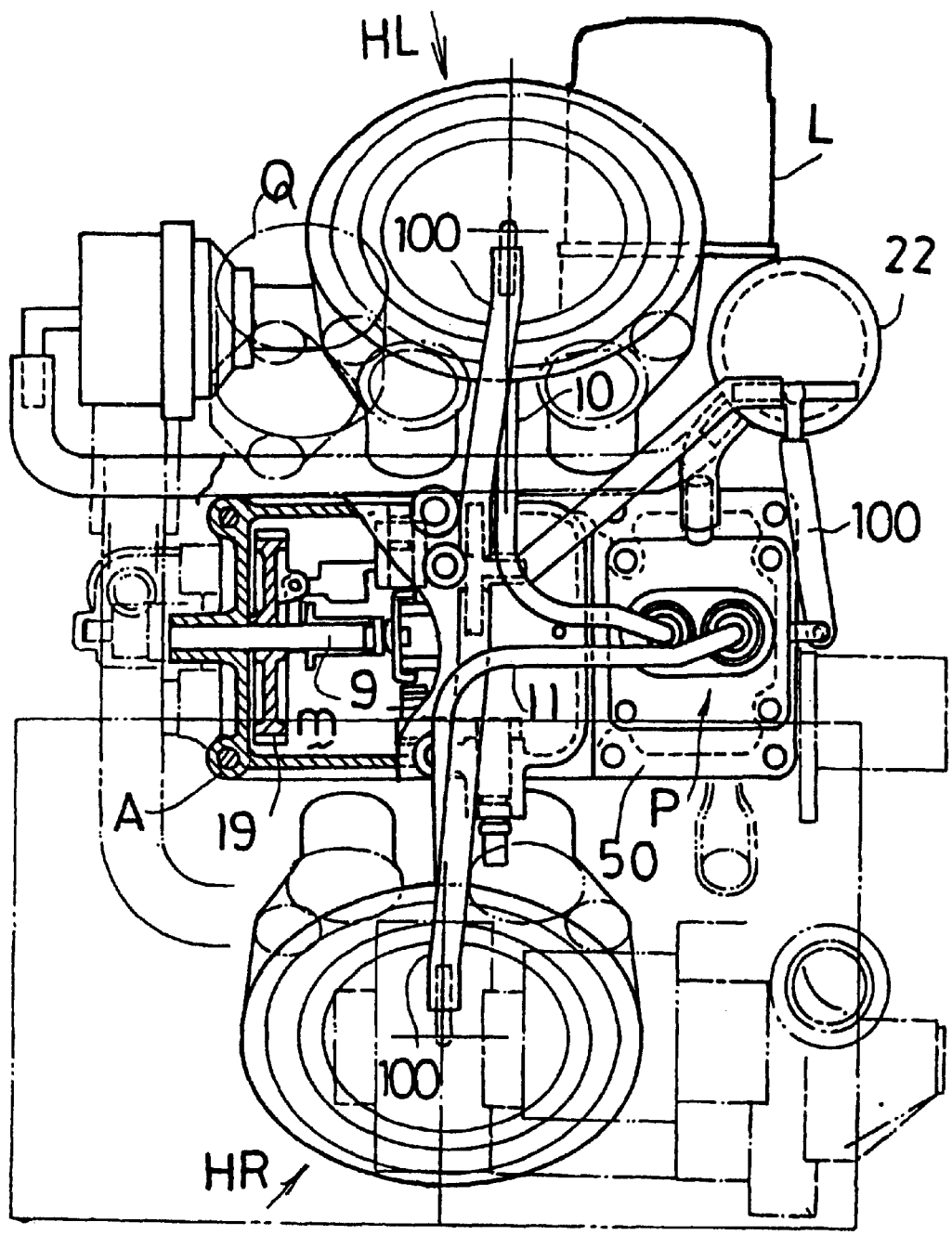
FIG. 4 is a plan view of the embodiment of FIG. 1.

As shown in FIG. 3, a driving gear 21 is fixed onto the front end of crankshaft S within crankcase 2. Driving gear 21 engages with a driving gear 43 of lubricating oil pump D which is supported within gear case 3 on left side thereof and engages with a camshaft driving gear 20 fixed onto camshaft 1 thereabove. Camshaft 20 engages with a governor shaft gear 19 fixed onto a governor shaft 9 of governor device G. A governor weight 25 is provided on the portion of governor shaft 9 disposed in governor case A.

Governor weight 25 opens and closes according to rotation of governor shaft 9 so that a L-like shaped governor lever 45 is rotated and a control rack of fuel injection pump P is slid. Also, an operator can operate regulator lever 41 projecting from governor case A to change the rotational speed of engine.

In crankcase 2, four intake and exhaust cams 31 project from camshaft 1 and two fuel injection pump driving cams 30 project from camshaft 1 toward the side of a flywheel W. Governor case A, housing governor device G, is disposed on the upper surface of a joining portion of crankcase 2 and gear case 3 and integrally forms bracket 50 at the extending portion thereof. Fuel injection pump P is fixed onto bracket 50.

A bracket 49 projects upwardly from crankcase 2 to support an air cleaner C. Flywheel W is fixed onto crankshaft S. Crankcase 2 forms a dynamo housing space 85, therewithin dynamo X is fixed onto flywheel W and can rotate.

Next, a V type diesel engine of horizontal type will be explained. As to shown in FIG. 4, a lubricating oil filter L is disposed on a left side of cylinder is HL, which is the same with flywheel W, and behind operating oil pump 12. A fuel filter 22 is supported by a bracket which projects from crankcase 2 or governor case A and is hung down on a side of fuel injection pump P.

Fuel returning pipes 100 are laid from fuel injection nozzles 26 and 27 and fuel injection pump P to fuel filter 22.

Figure 5:
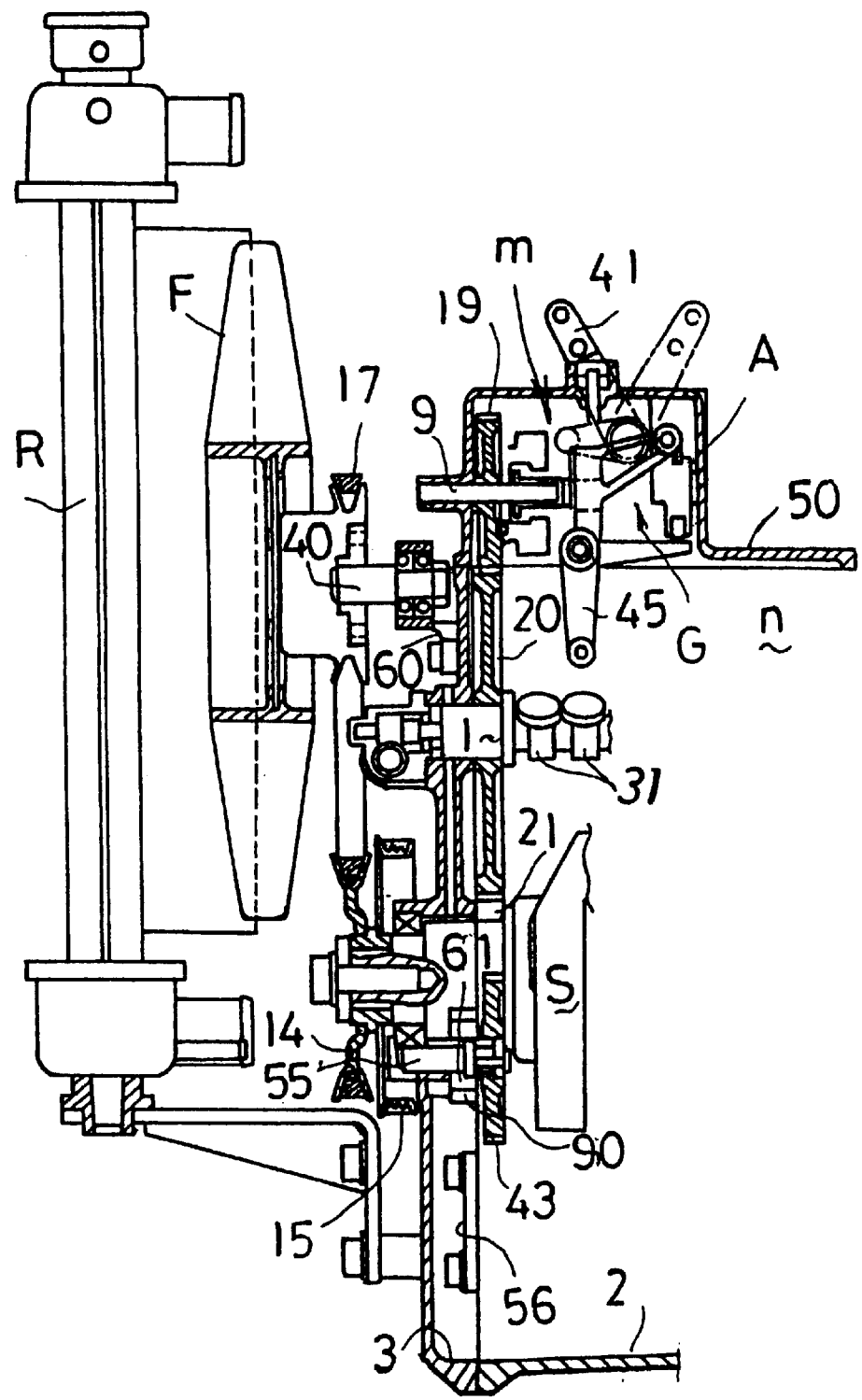
FIG. 5 is a partial cross-sectional right side view of the embodiment of FIG. 1, showing gear case 3.

In FIG. 5 showing radiator R and gear case 3, governor case A is disposed on the top of crankcase 2 and gear case 3 and extended to form bracket 50 for mounting fuel injection pump P.

Figure 6:
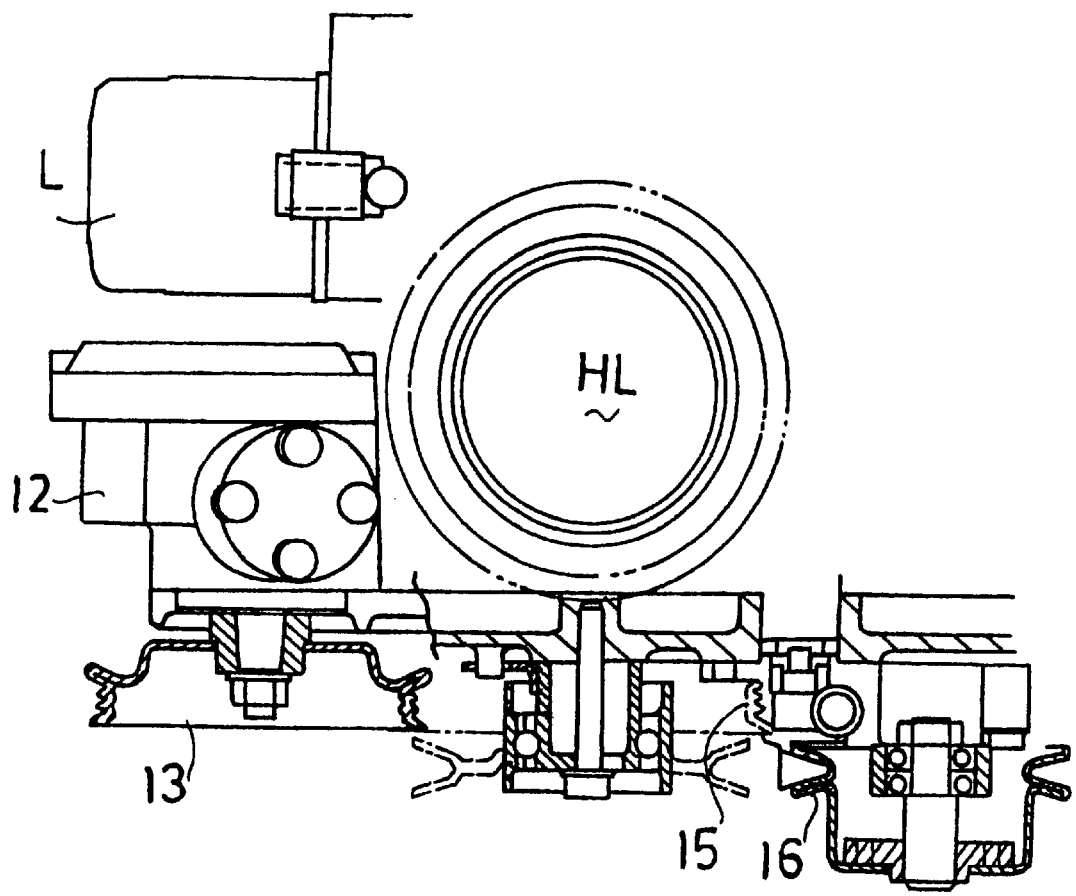
FIG. 6 is a partial cross-sectional plan view of the embodiment of FIG. 1, showing pulleys 13, 15 and 16.

In FIG. 6 are shown cylinder HL and pulleys 13, 15 and 16, and positional relationships between operating oil pump 12 and lubricating oil filter L.

As shown in FIG. 7, which is an enlarged view of cylinders HL and HR, lubricating oil filter L is disposed under cylinder HL and on the same side with operating oil pump 12. Fuel injection nozzles 26 and 27, governor device G and fuel injection pump P are disposed between pushrods 24.

FIGS. 8 to 12 describe the vertical V type diesel which which has crankshaft S vertically disposed.

Figure 11:
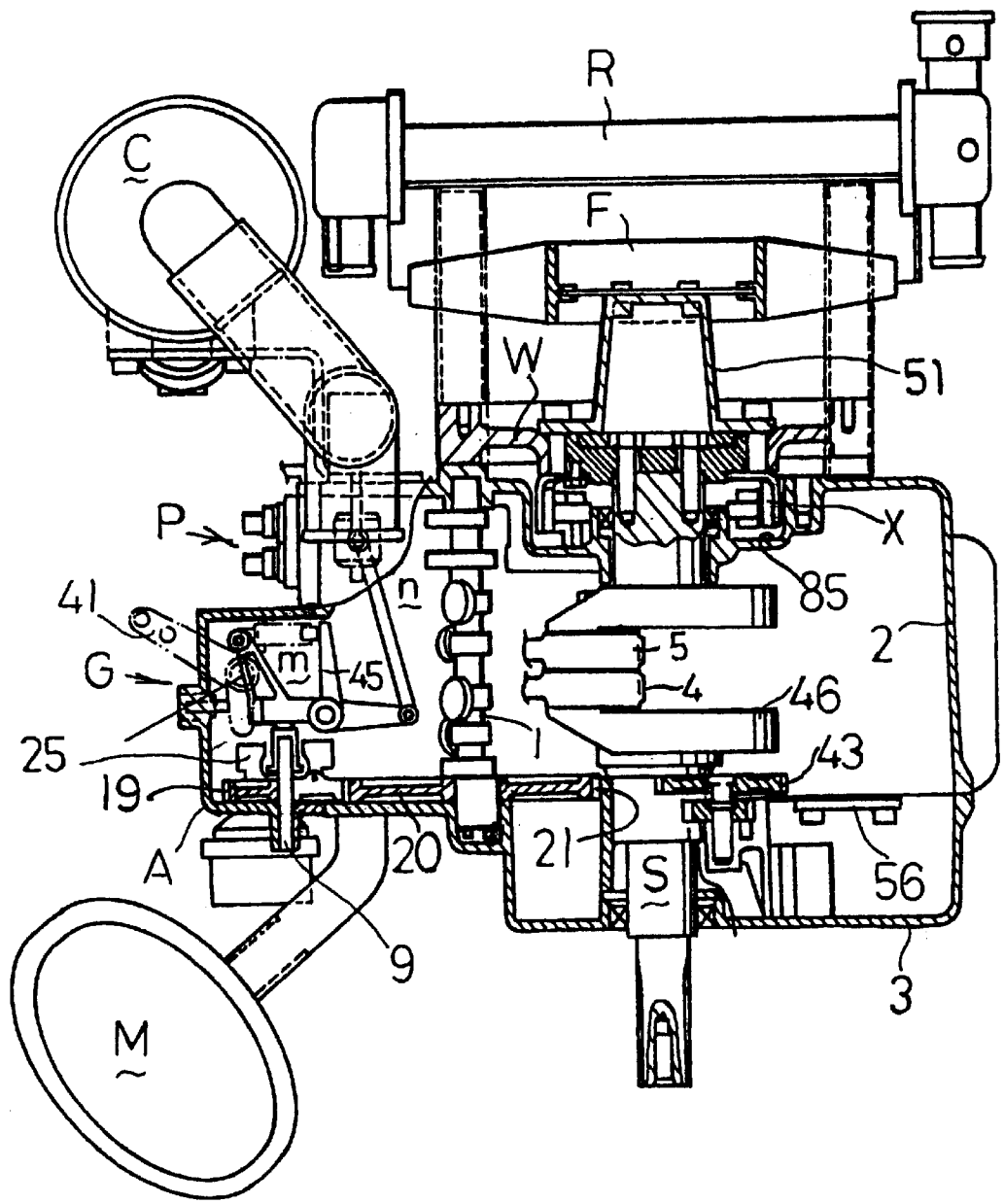
FIG. 11 is a cross-sectional right side view of the embodiment of FIG. 8.
Figure 12:
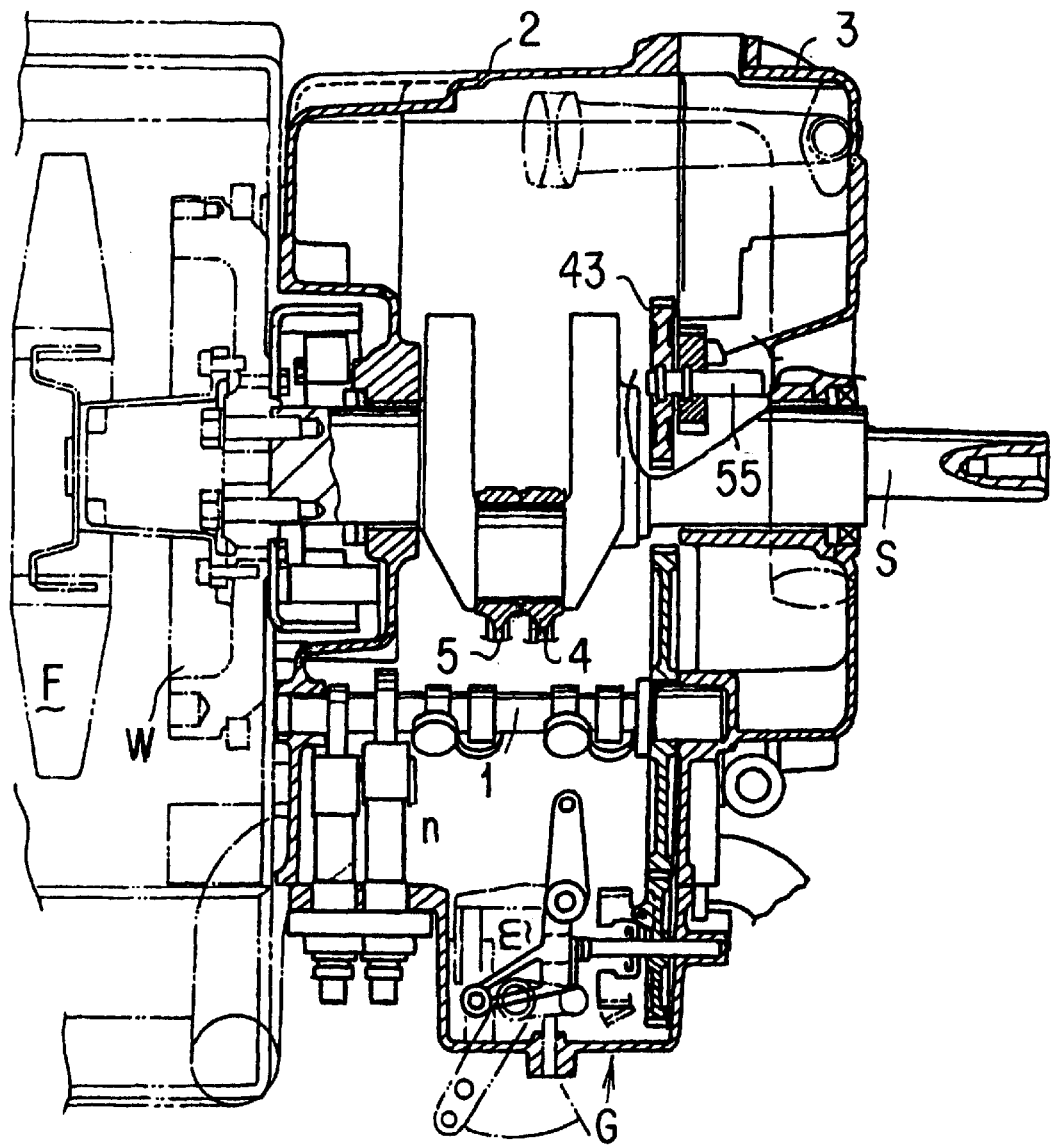
FIG. 12 is an enlarged partial cross-sectional right side view of the embodiment of FIG. 8.

In such a case, the engine is fixed on a working machine with crankcase 2 above gear case 3, so that gear case 3 constitutes a main oil pan. As shown in FIG. 11, gear case 3 is expanded downwardly to deepen its interior. There are many cases that the working machine is disposed below the engine. Therefore, the power output portion of crankshaft S projects downwardly from the bottom of gear case 3.

Radiator R is disposed on the same side as gear case 3 of the horizontal type engine and on the upper portion of the vertical type engine, which is a portion opposite to gear case 3. Flywheel W is fixed onto crankshaft S. Also, radiator fan F is fixed through a fan seat 51 onto crankshaft S.

Figure 9:
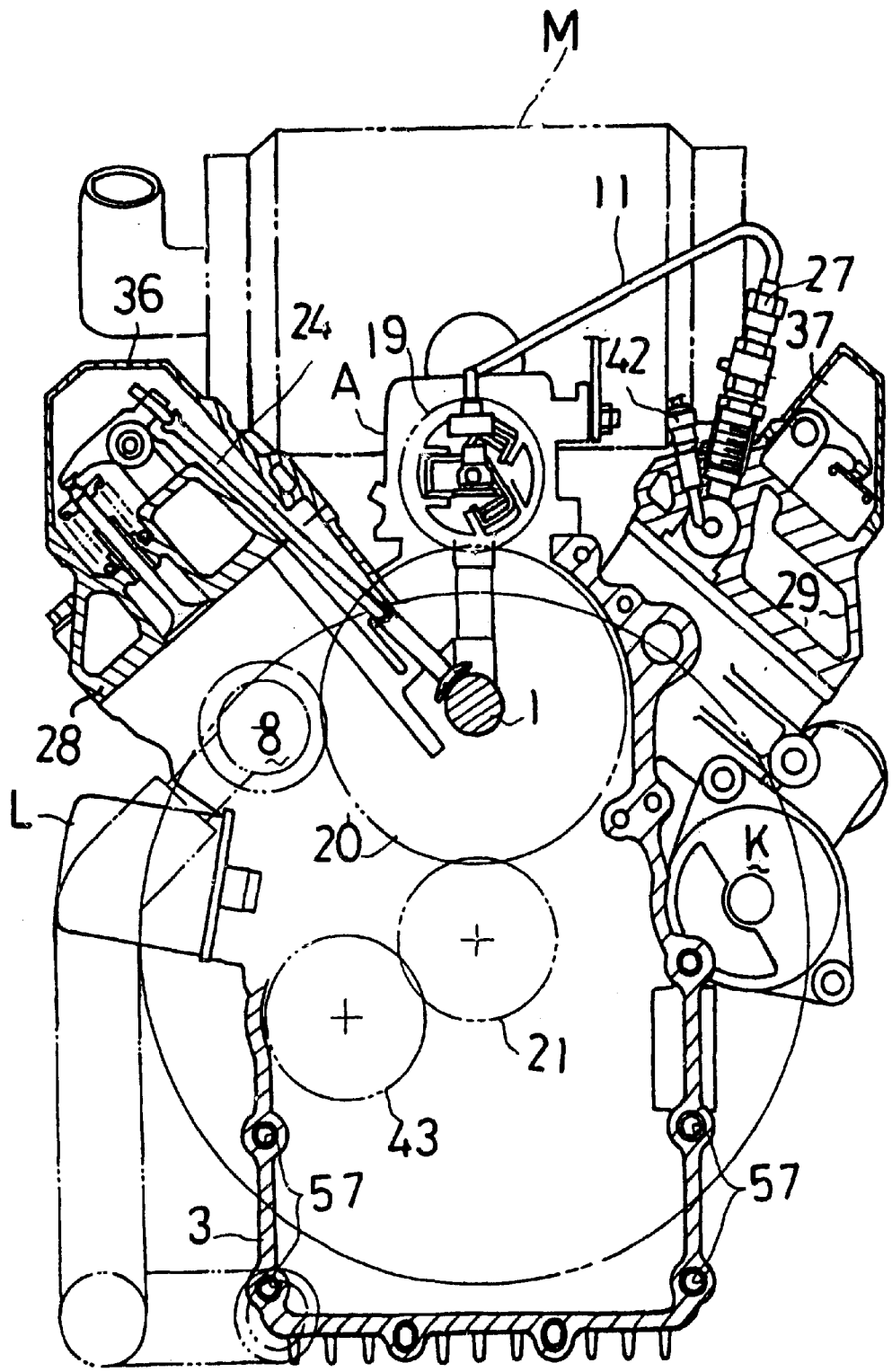
FIG. 9 is a cross-sectional bottom view of the embodiment of FIG. 8.
Figure 10:
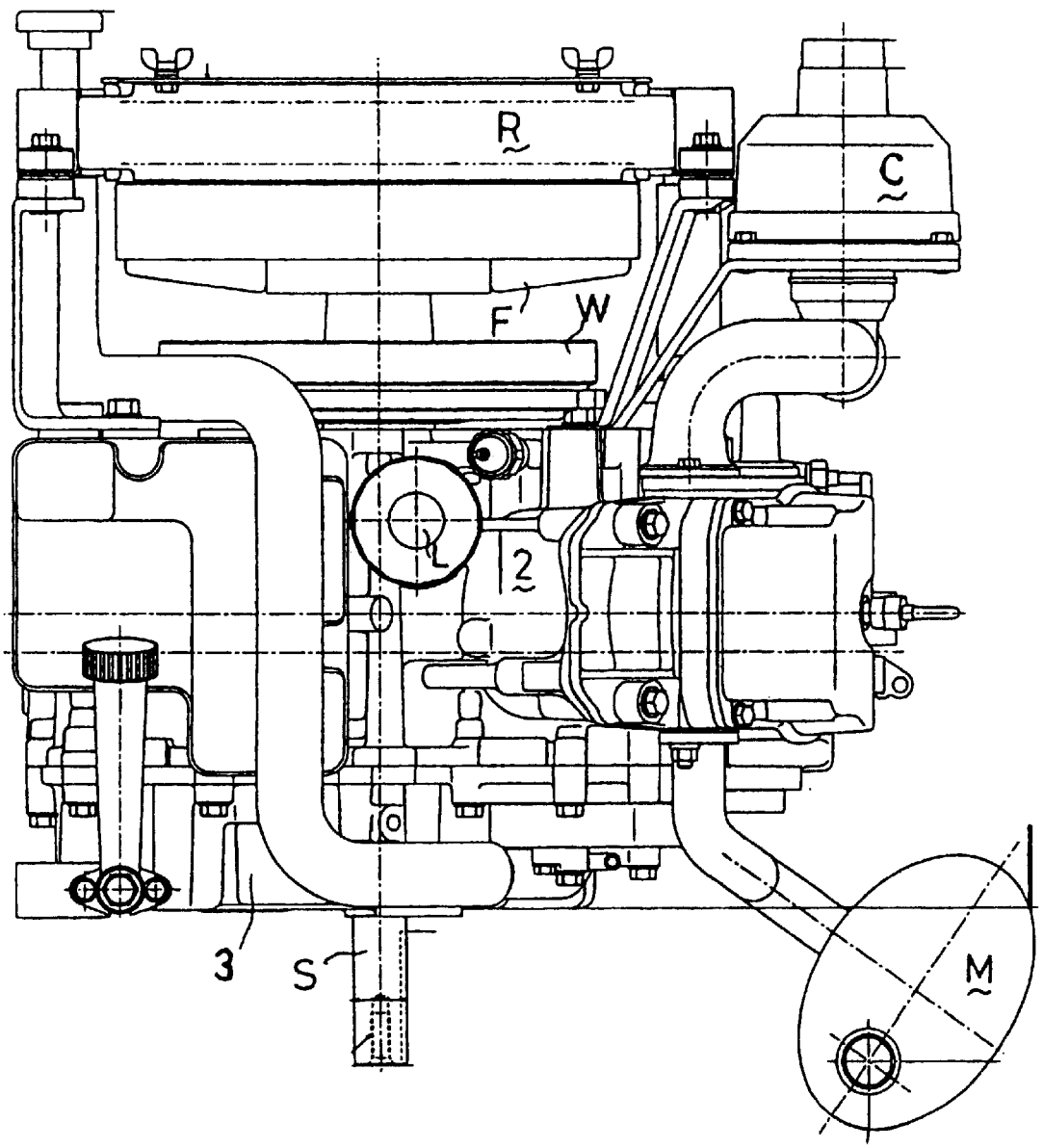
FIG. 10 is a left side view of the embodiment of FIG. 8.
Figure 13:
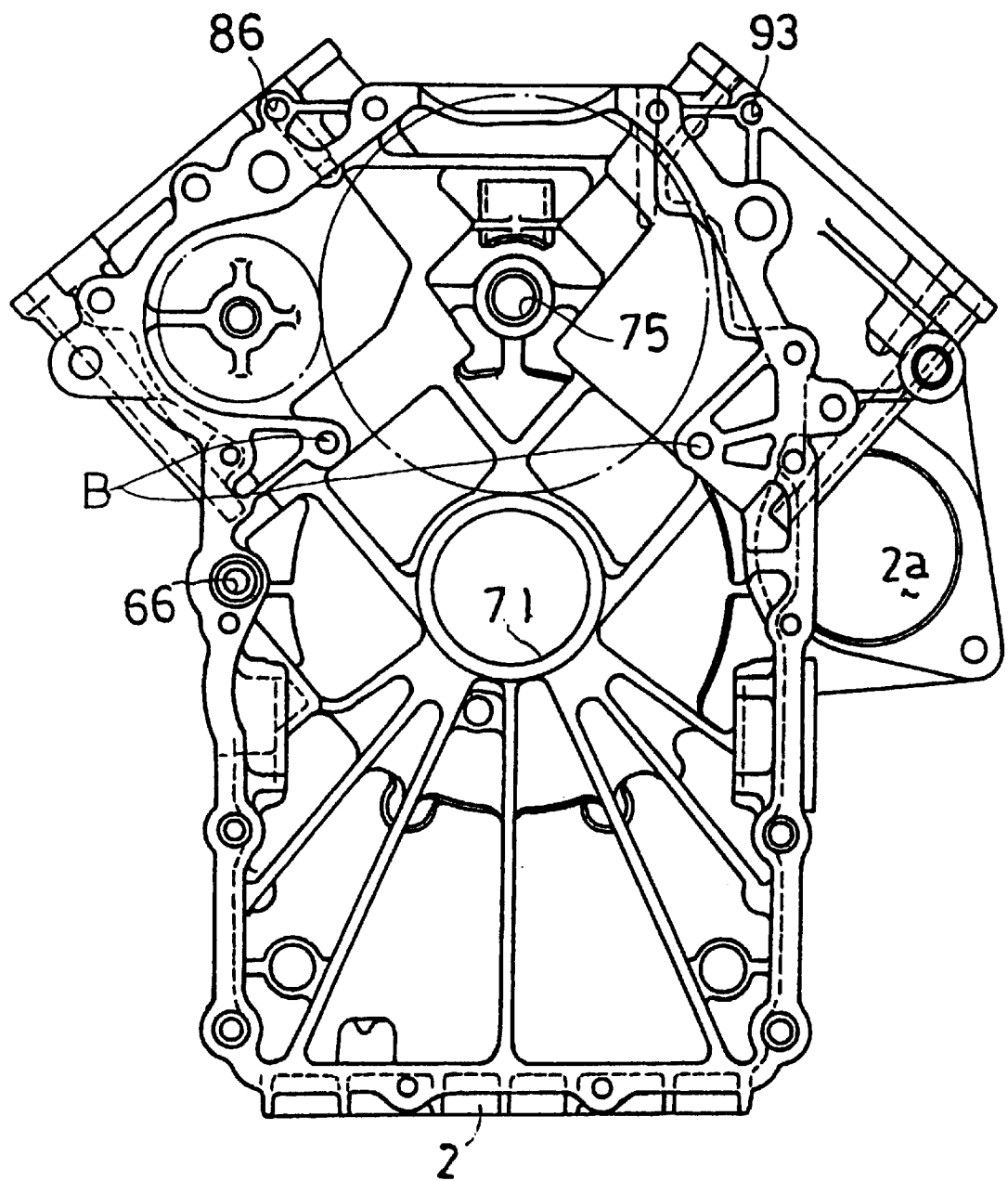
FIG. 13 is a front view of crankcase 2.

As shown in FIGS. 9 and 11, blocking member 56 is laid over the opening lower portion of crankcase 2 to prevent it from being widened by load. Around blocking member 56, crankcase 2 and gear case 3 are fastened together with bolts 63 screwed in threaded bosses 57. Threaded bosses 57 provide reinforcement for bolts 63 fastening crankcase 2 and gear case 3 to prevent the opening bottom of crankcase 2 from being widened by load stresses. The positional relationships between crankcase 2 and gear case 3 are defined by parallel pins inserted into parallel pin holes B as shown in FIG. 13.

The construction of crankcase 2 is detailed below with reference to FIGS. 13 to 24. As shown in FIG. 13, bearing journal 71 for journalling crankshaft S and bearing journal 75 for journalling camshaft 1 are bored through the interior of crankcase 2. Also, pivotal shaft portion 2a and oil passages 66, 86 and 93 are bored through crankcase 2.

In a conventional V type diesel engine, a lubricating oil feeding system for feeding various portions with lubricating oil has a main gallery from which the crankshaft receives lubricating oil. The main gallery includes a hole bored or cast through a boss formed within a side wall of a crankcase. In such a construction, supplemental devices are attached to the side wall of the crankcase necessarily disposed to avoid the boss portion including the main gallery, thereby widening the entire lubrication system of the engine. Furthermore, a rotational direction of a crankshaft is often reversed in accordance with a kind of a machine driven by the engine. In this case, the rotational direction of a lubricating oil pump is reversed.

In the present V type diesel engine comprising crankcase 2 and gear case 3 jointed with each other, lubricating oil filter L is attached on a side of crankcase 2, and lubricating oil pump D is constructed in gear case 3. Lubricating oil discharged from lubricating oil pump D and filtered through lubricating oil filter L is fed to the journal portion journalling crankshaft S through oil passages in crankcase 2.

Figure 29:
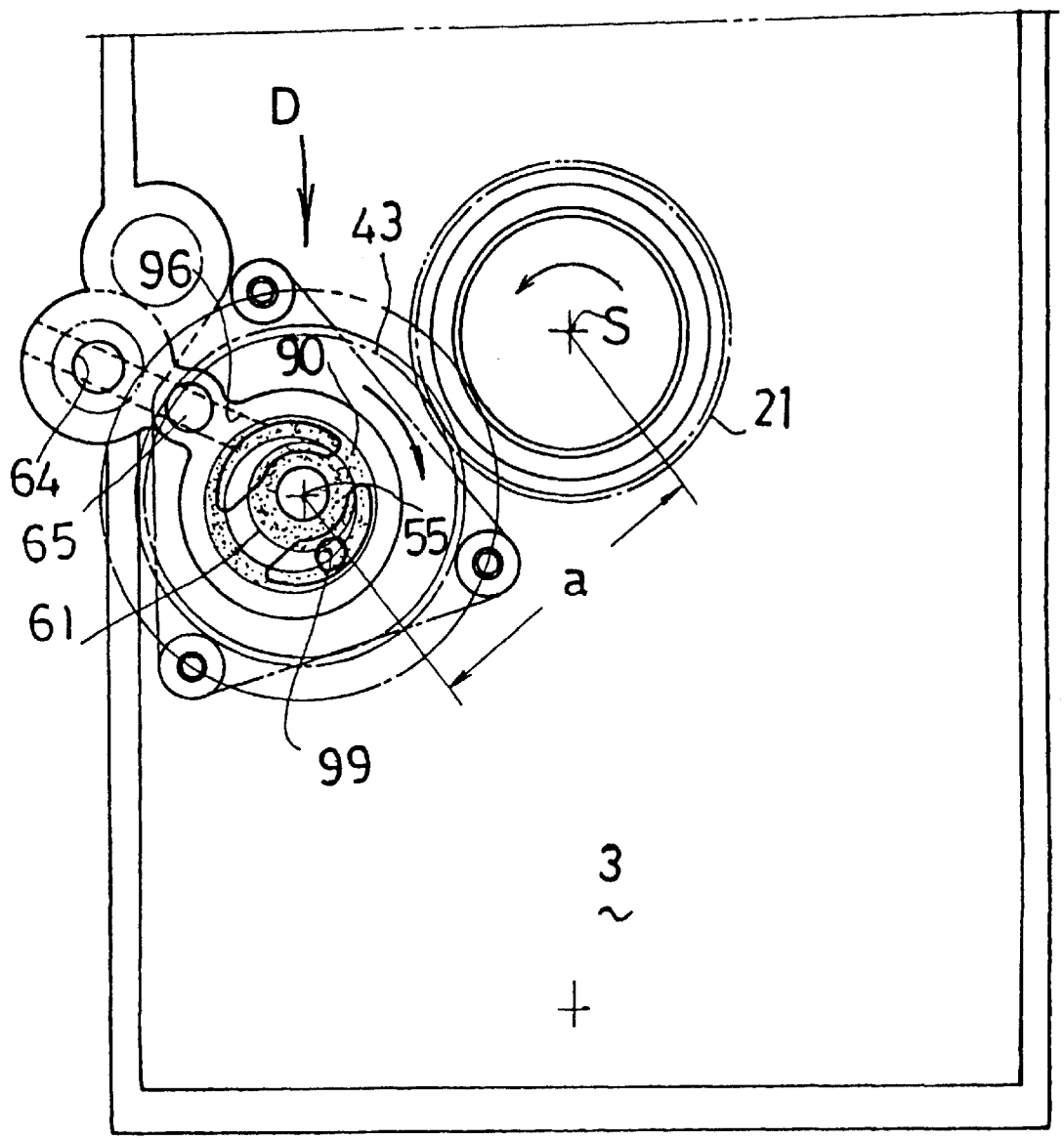
FIG. 29 is a schematic rear view of the the gear case of FIG. 25, showing lubricating oil pump D which is rotated clockwise.
Figure 30:
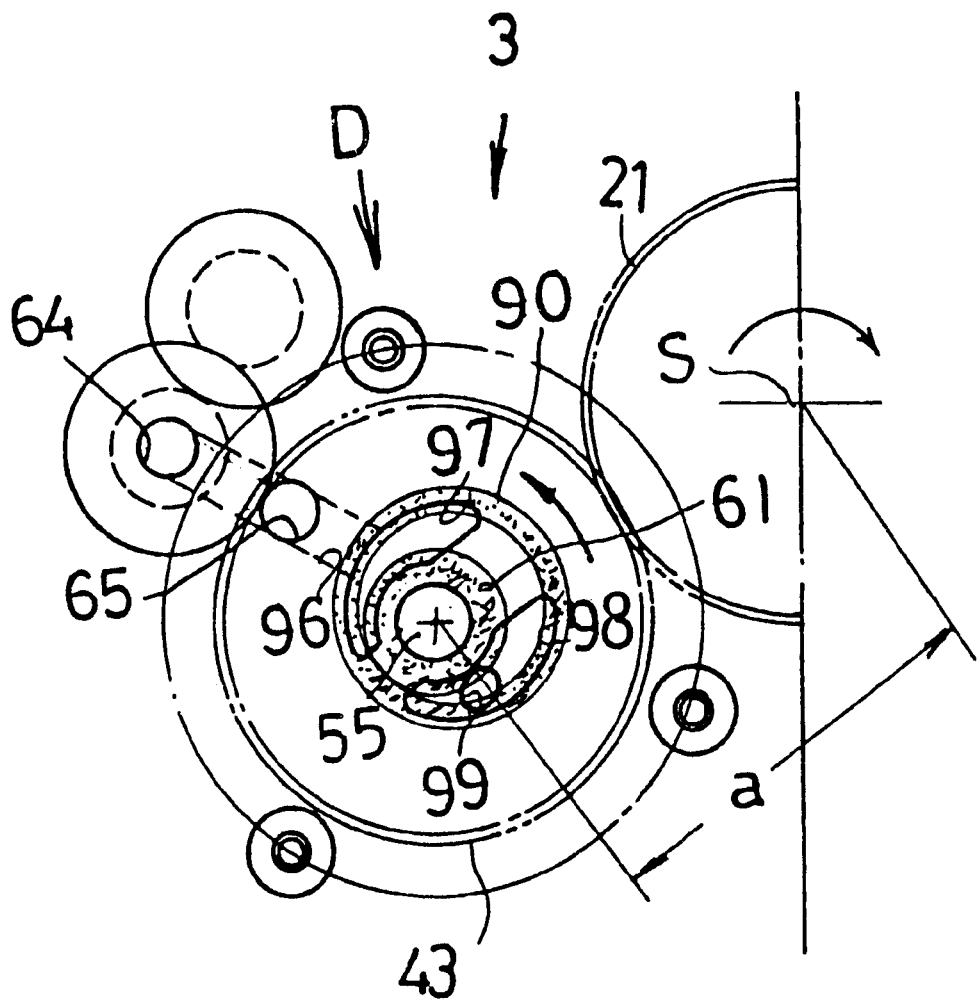
FIG. 30 is a schematic rear view of the the gear case of FIG. 25, showing lubricating oil pump D which is rotated counterclockwise.

As shown in FIGS. 29 and 30, pump rotors 90 and 61 of lubricating oil pump D can reverse their rotational directions. An axis of a lubricating oil pump shaft 55 takes the same position with a discharging hole 96, and a different position from grooves 97 and 98 and a intake hole 99.

Figure 26:
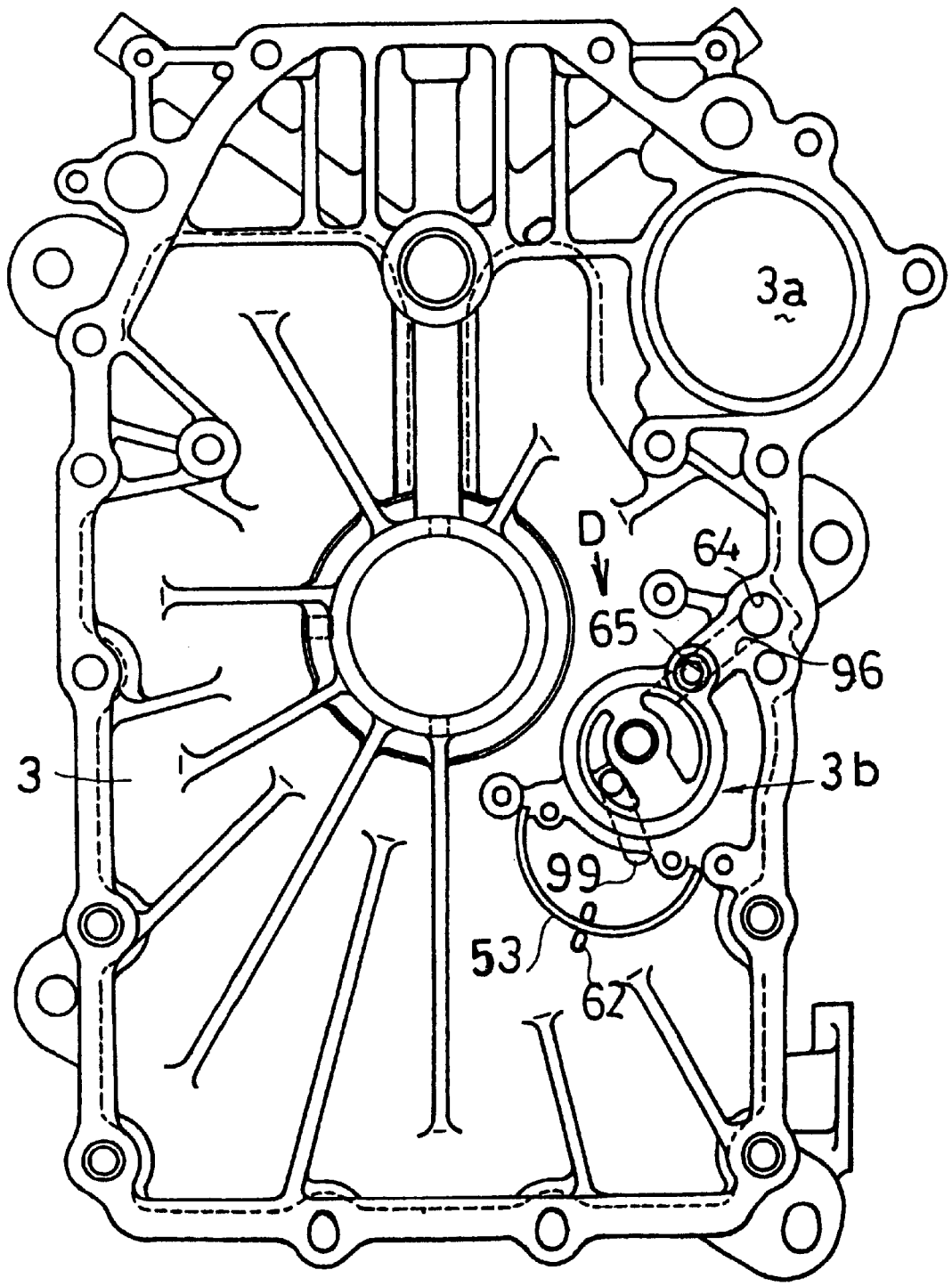
FIG. 26 is a rear view of the the gear case of FIG. 25.
Figure 27:
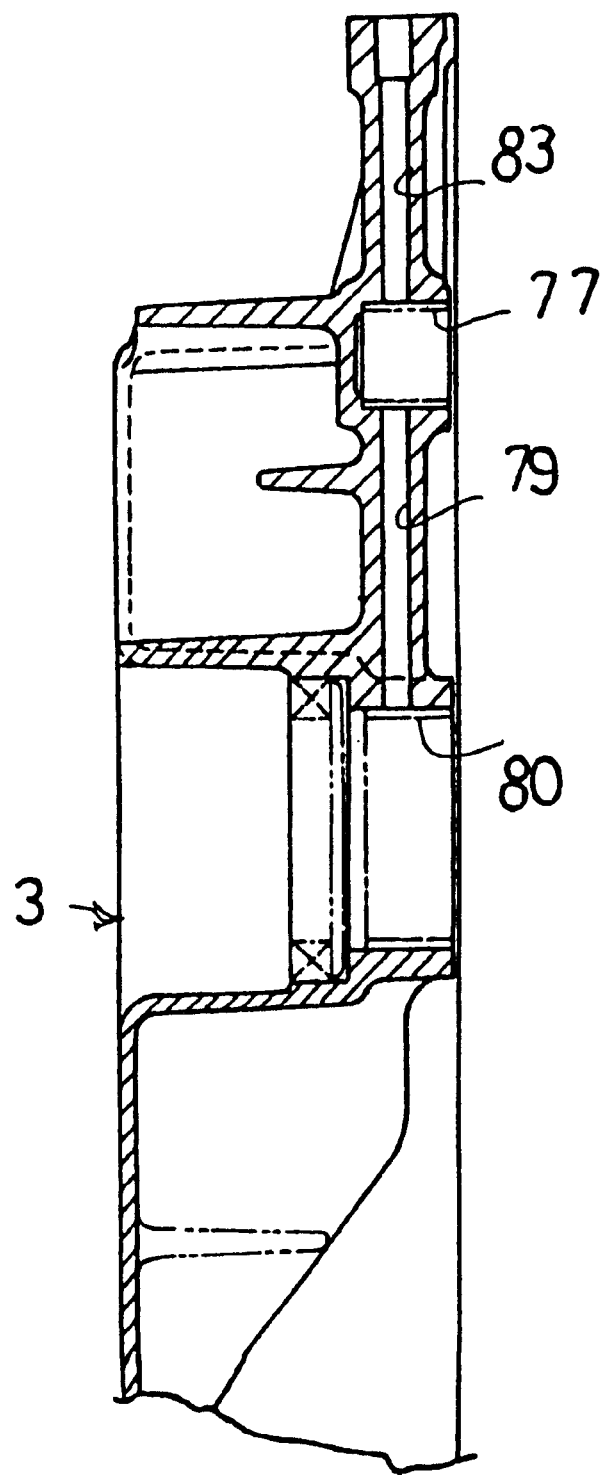
FIG. 27 is a cross-sectional side view of the the gear case of FIG. 25, showing oil passages within an upper portion thereof.
Figure 28:
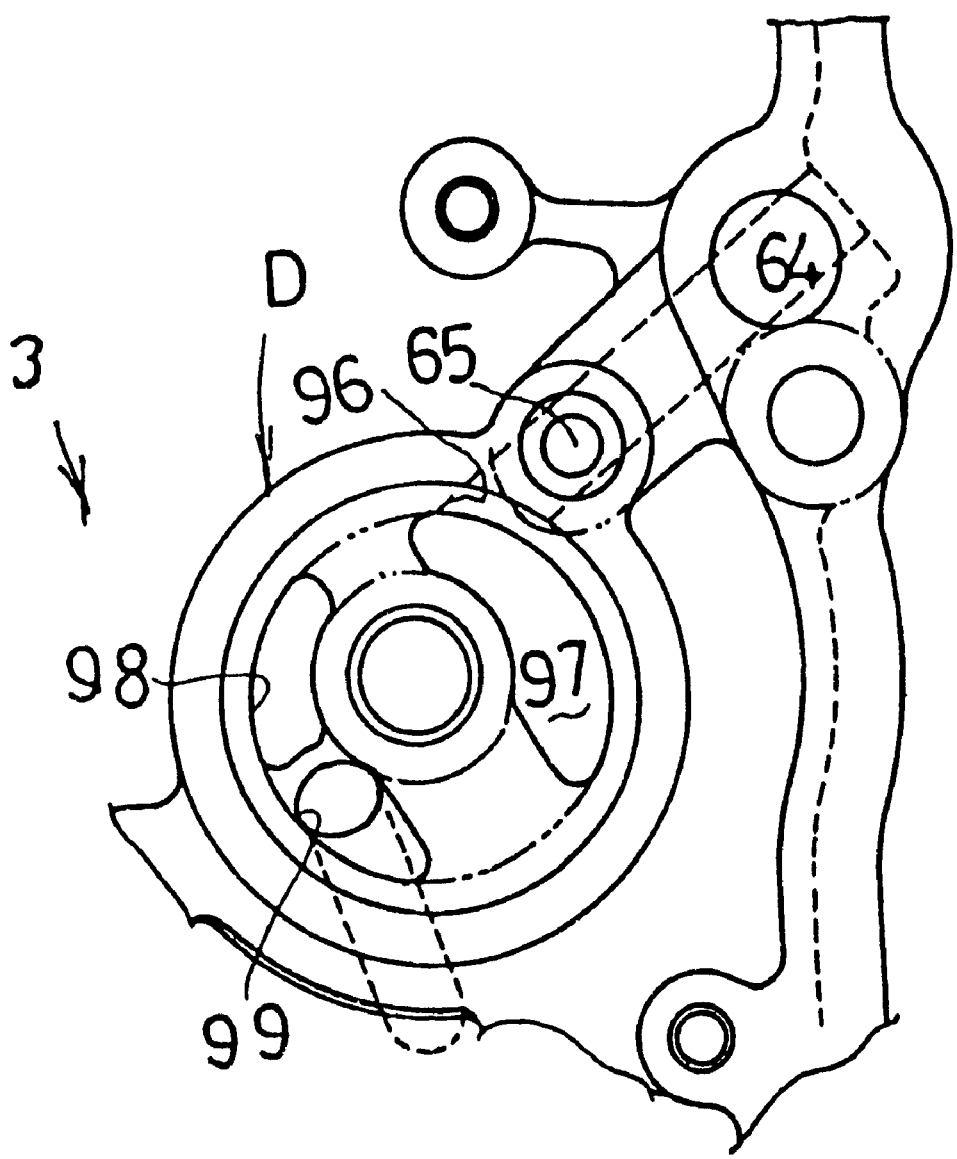
FIG. 28 is an enlarged partial rear view of the the gear case of FIG. 25, showing grooves 97 and 98 constituting lubricating oil pump D.

As shown in FIG. 26, the vertical type engine has a filter net 53 mounted on gear case 3 near intake hole 99 of lubricating oil pump D. Filter net 53 is engaged to projection 62 of gear case 3.

Pump shaft 55 is pivoted in gear case 3. Driving gear 43 for driving lubricating oil pump D is fixed onto the end of lubricating oil pump shaft 55 and engages with a driving gear 21. Pump rotor 61 constituting a gear is fixed onto lubricating oil pump shaft 55. Pump rotor 90 engages with pump rotor 61 to slidably rotate around pump rotor 61.

Lubricating oil filter L is disposed below fuel filter 22 and on a side of crankcase 2 behind operating oil pump 12. Starter K is disposed on a right side of crankshaft 2 opposite to supplement devices N such as lubricating oil filter L and operating oil pump 12.

Fuel filter 22 is disposed on the same side with flywheel W of crankcase 2. In a vertical type engine, it is disposed below radiator R but at the highest position of crankcase 2. In a horizontal type engine, it is disposed at the highest of fuel feeding system for fuel injection pump P, which is above fuel injection pump P, cylinder heads 28 and 29 and cylinder head covers 36 and 37. Accordingly, the fuel filtered through fuel filter 22 can be free of air.

Fuel filter 22 is fed with fuel from fuel feed pump Q driven by fuel feed pump driving cam 58.

The construction of lubricating oil pump 22 D will be explained. Lubricating pump D comprises lubricating oil pump shaft 55, which is provided with pump rotors 90 and 61, disposed within a recess of gear case 3, and is driven by driving gear 43. intake hole 99 is opened toward the interior of gear case 3 and connected to groove 98, and discharging hole 96 is bored between groove 97 and relief valve 65. Accordingly to rotation of pump rotors 90 and 61, lubricating oil in gear case 3 is sucked into groove 98 through intake hole 99 and is discharged into the other groove 97. Then, the lubricating oil is pressured in groove 97 and is discharged into discharging hole 96. When the pressure of lubricating oil in discharging hole 96 reaches the predetermined degree, relief valve 95 operates to relieve the lubricating oil for safety.

The lubricating oil discharged through discharging hole 96 and relief valve 65 is sent to an oil passage 66 of crankcase 2 through an oil passage 64 of gear case 3.

There are cases that the rotational direction of crankshaft S is required to be reversed, according to difference between a vertical type and a horizontal type, or without reference to the engine type. Therefore, gear case 3 is classified into two types as shown in FIGS. 29 and 30. In FIG. 29, pump rotors 90 and 61 are rotated clockwise in a rear view. In FIG. 30, they are rotated counterclockwise in a rear view.

However, the distance a between axes of crankshaft S and lubricating oil pump shaft 55 is similar in both cases, so that driving gear 21 and driving gear 43 can be made of common members. Pump rotor 90 of one type differs from that of the other type in its rotational axis while both types have the common distance a.

Figure 31:
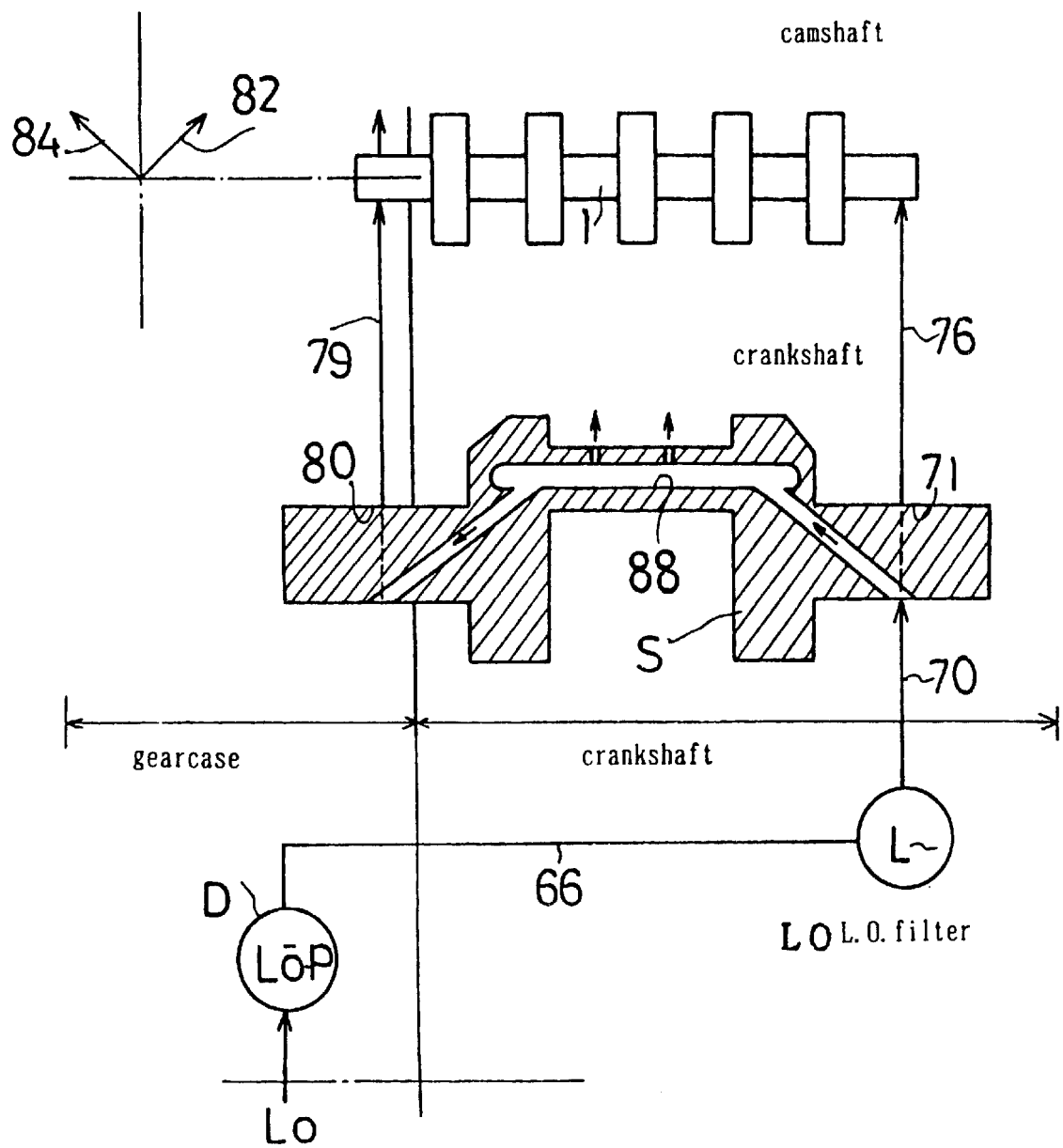
FIG. 31 is a diagram showing a lubrication system of the V type diesel engine according to the present invention.

Referring to FIG. 31, lubricating oil is discharged from lubricating oil pump D into oil passage 66 through oil passage 64. The lubricating oil passes through a lubricating oil filter L through oil passage 66 within crankcase 2 and passes through an oil passage 70 bored through crankcase 2. Part of the oil enters one opening end of an inner oil passage 88 bored through crankshaft S, and another part of it passes through an oil passage 76 and reaches a rear end journal portion of camshaft 1 to lubricate. The lubricating oil in inner oil passage 88 is fed to connecting rods 4 and 5. The lubricating oil from the other opening end of inner oil passage 88 passes through an oil passage 79 and reaches the front end journal portion of camshaft 1 to lubricate.

The lubricating oil, which has lubricated the front end journal portion of camshaft 1, branches into branching oil passages 82 and 84, passes through oil holes bored within crankcase 2 and cylinder heads 28, and reaches rocker arm 47 to lubricate.

Figure 14:
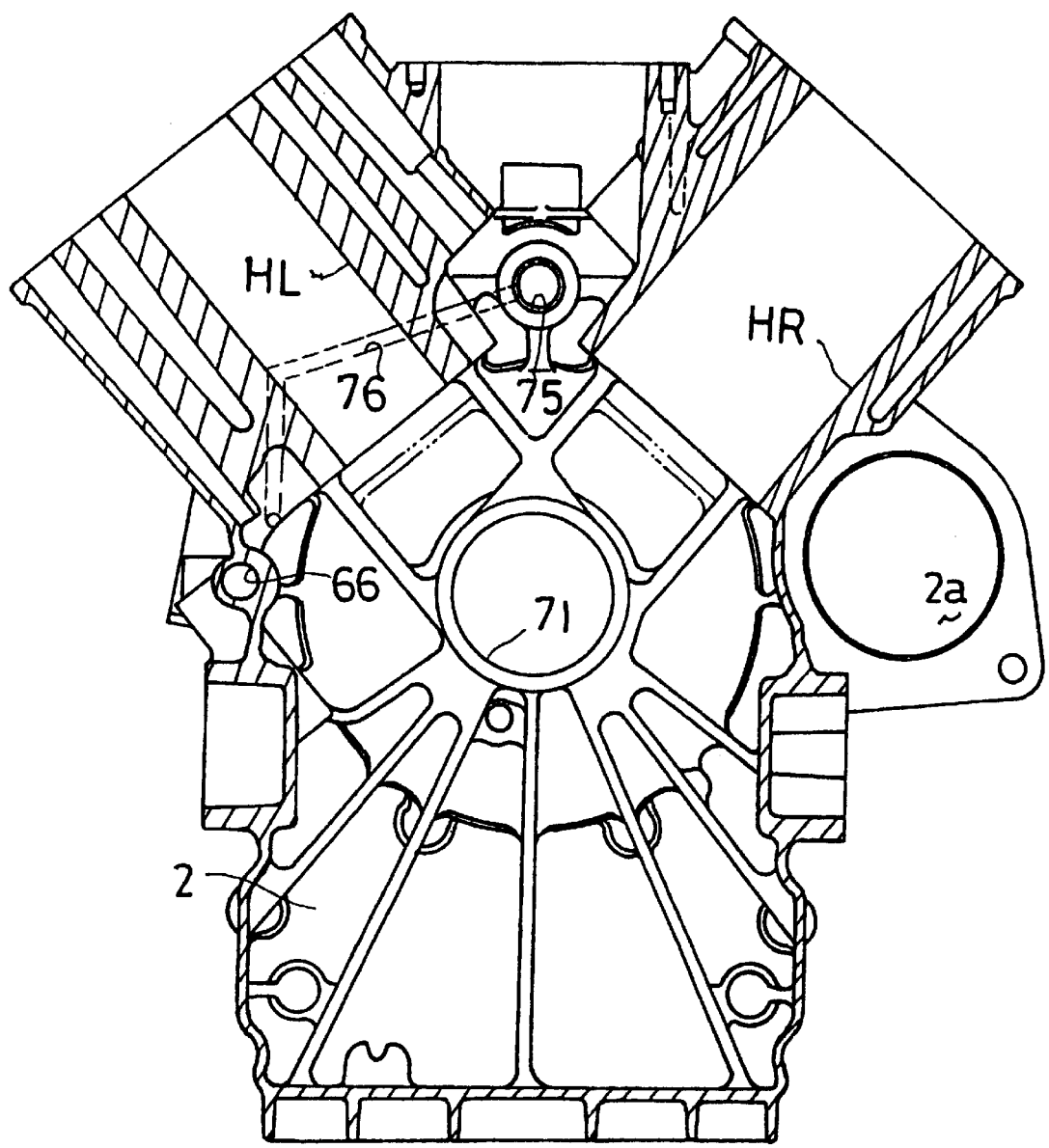
FIG. 14 is a cross-sectional front view of the the crankcase of FIG. 13.
Figure 15:
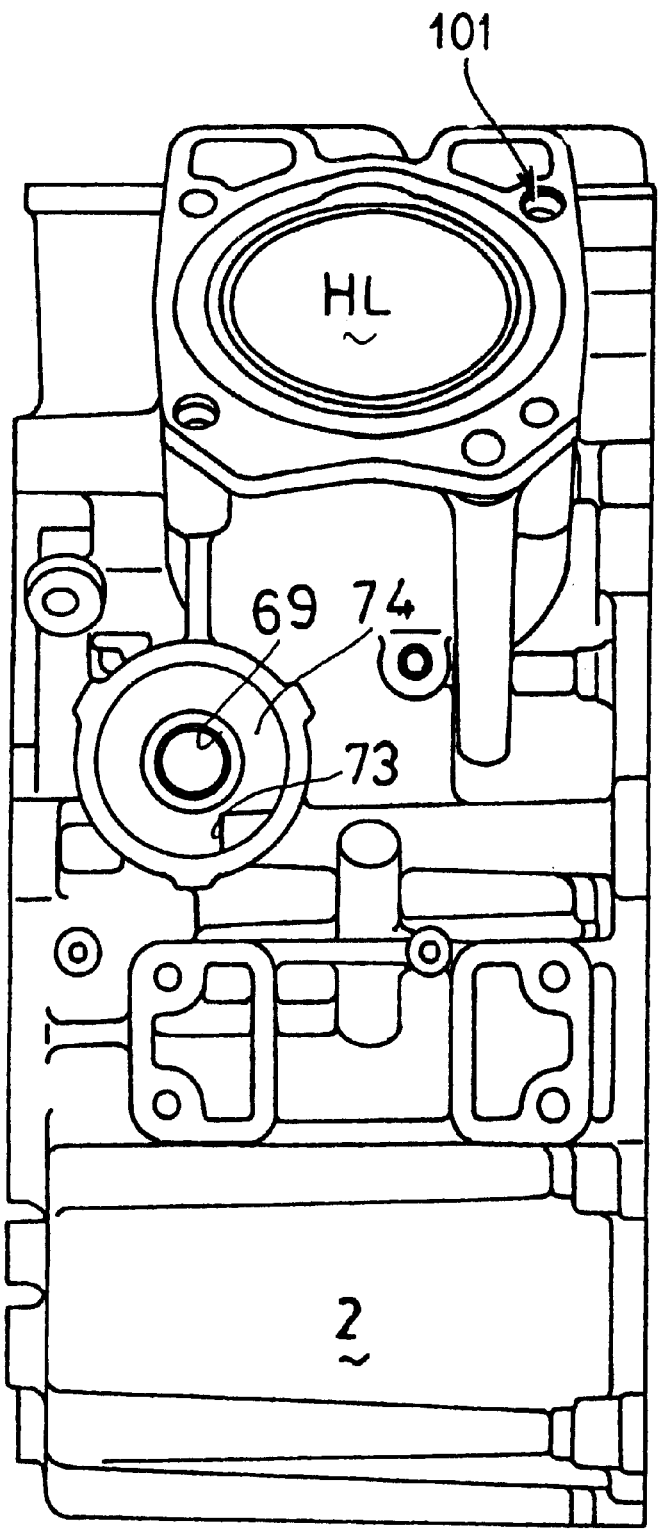
FIG. 15 is a left side view of the the crankcase of FIG. 13.
Figure 16:
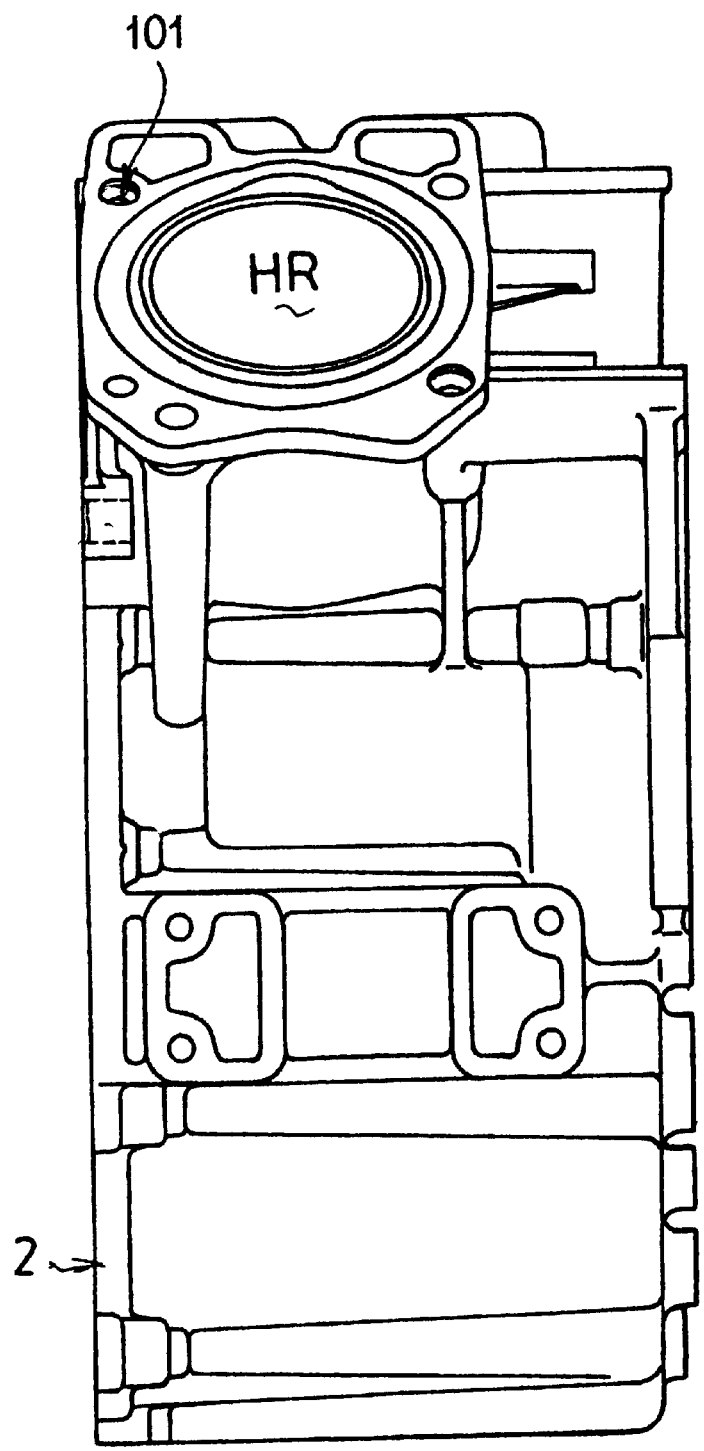
FIG. 16 is a right side view of the the crankcase of FIG. 13.
Figure 22:
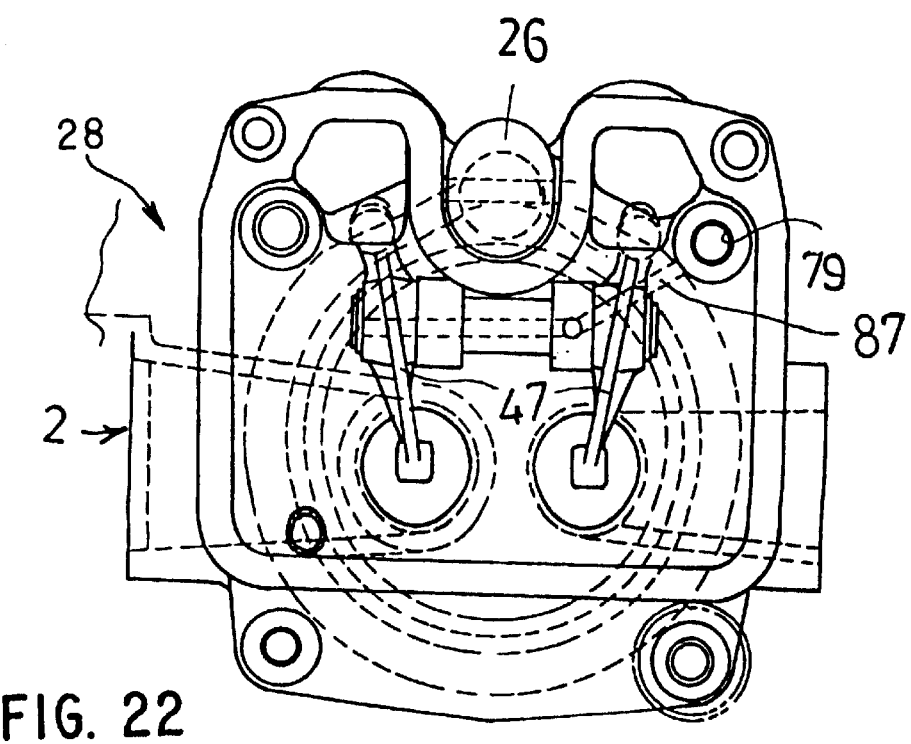
FIG. 22 is a plan view of a cylinder head 29 on crankcase 2.
Figure 23:
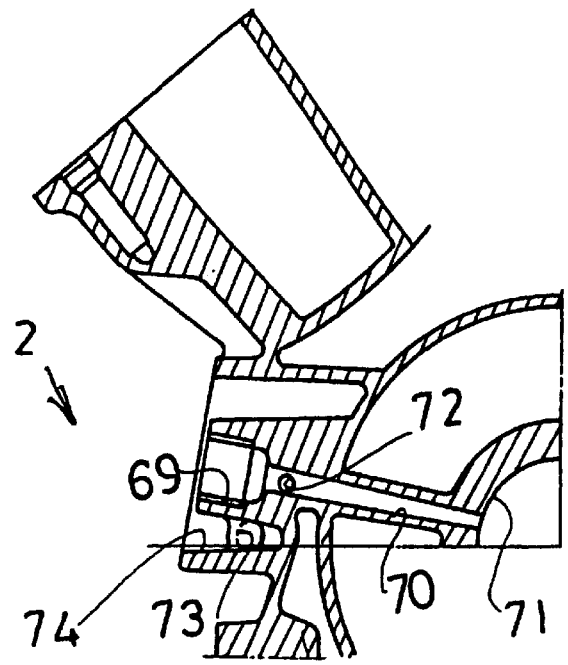
FIG. 23 is a partial cross-sectional front view of crankcase 2, showing an external lubricating oil filter seat 74 for mounting lubricating oil filter L thereinto.
Figure 24:
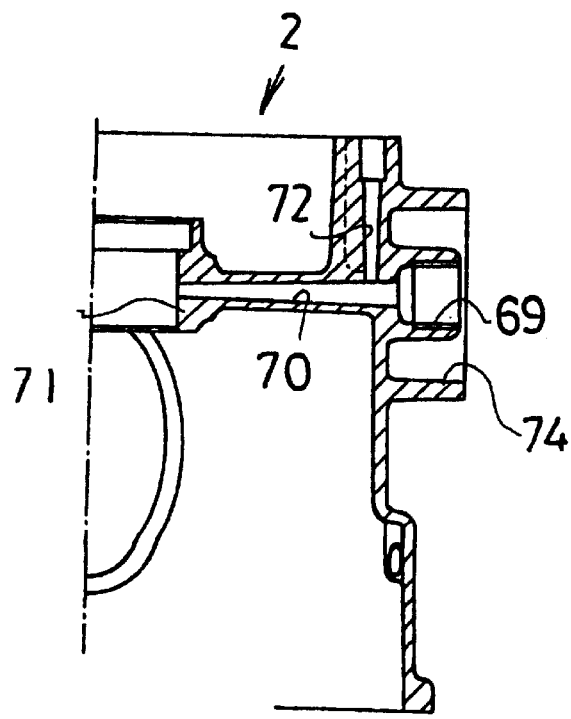
FIG. 24 is a partial cross-sectional plan view of the the crankcase of FIG. 23, showing the external lubricating oil filter seat 74.
Figure 25:
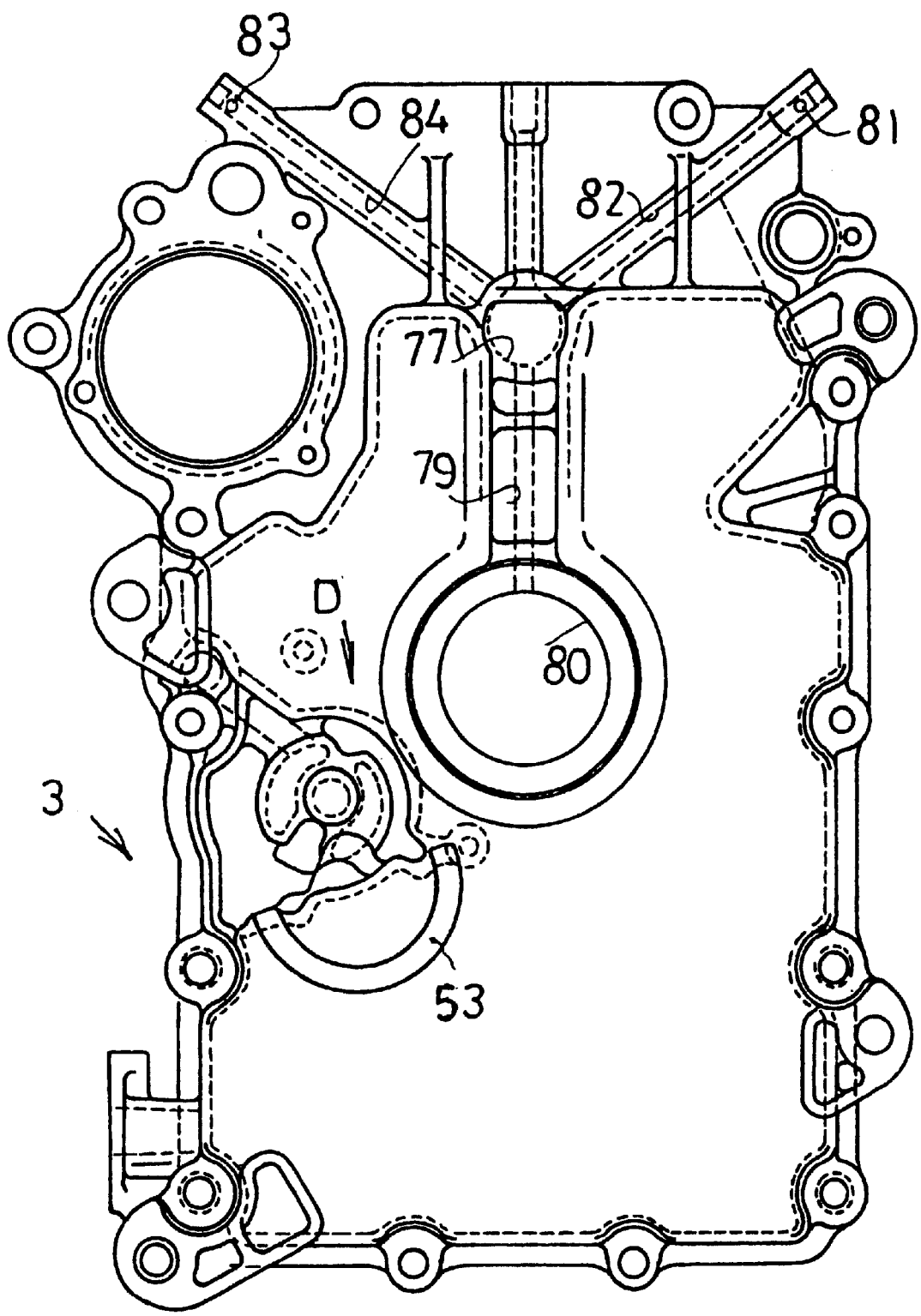
FIG. 25 is a front view of gear case 3.

The lubricating oil circuit between gear case 3 and rocker arms 47 is described below in accordance with FIGS. 13 to 30. FIG. 13 shows an oil passage 66 of crankcase 2 which is connected with oil passage 64 of gear case 3. As shown in FIG. 14, oil passage 66 is bored through a boss of crankcase 2 and reaches a discharging hole 73 opening to an external lubricating oil filter seat 74 shown in FIG. 15. The lubricating oil discharged from discharging hole 73 penetrates lubricating oil filter L attached to external lubricating oil filter seat 74 from the exterior thereof, and is filtered through an inner filter within lubricating oil filter L. The filtered lubricating oil passes through oil passage 69 and reaches bearing journal 71 of crankcase 2, as shown in FIGS. 23 and 24.

Figure 17:
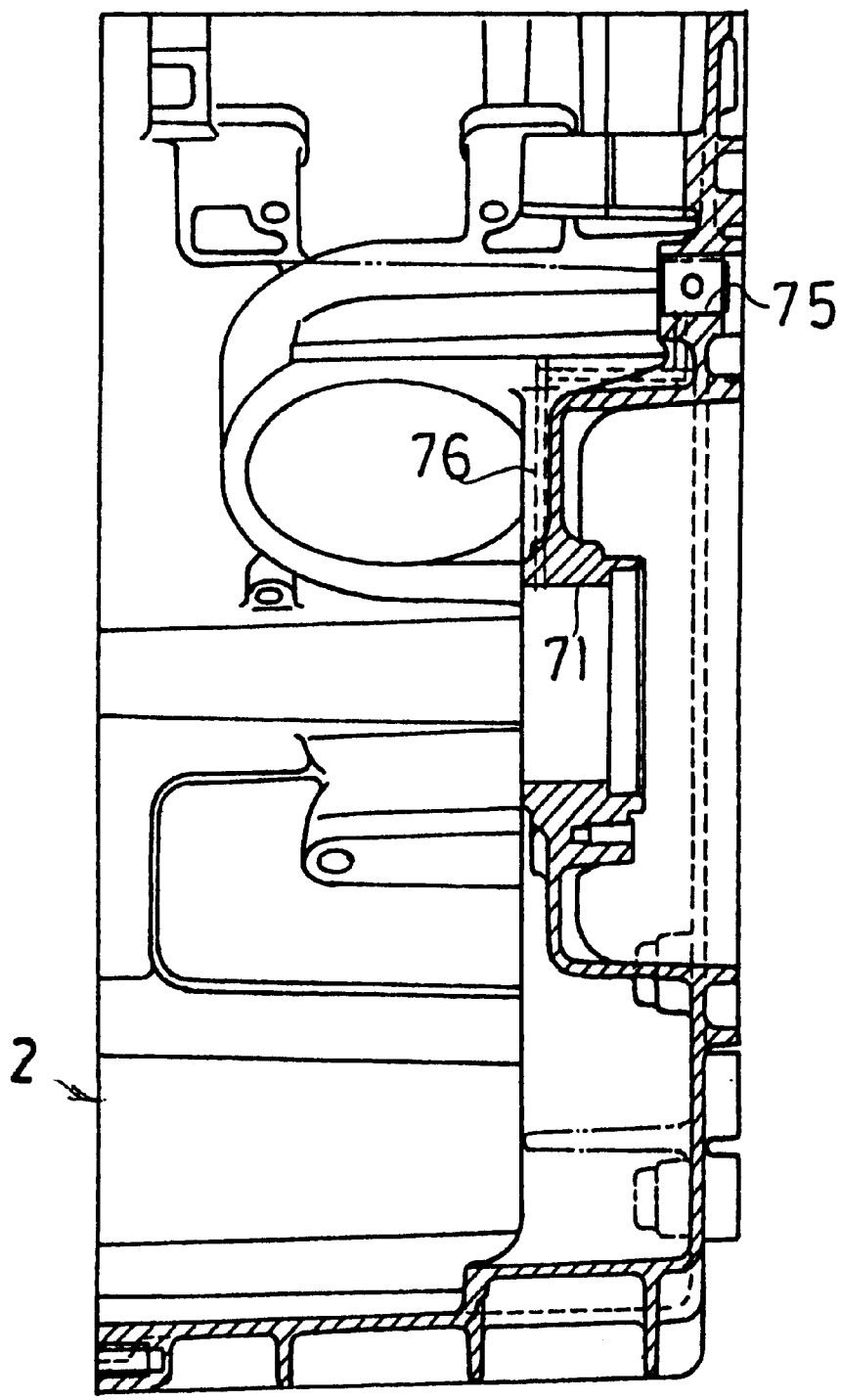
FIG. 17 is a cross-sectional right side view of the the crankcase of FIG. 13.

An oil passage 72 branches out from oil passage 70 before bearing journal 71, and, as shown in FIG. 17, an oil passage 76 is bored upwardly from oil passage 72 to bearing journal 75 of crankshaft 2 to lubricate the portion of camshaft 1 journalled by bearing journal 75. As shown in FIG. 31, the lubricating oil, which lubricated bearing journal 71, passes through inner oil passage 88 bored within crankshaft S and is discharged to bearing journal 80 of gear case 3. Oil passage 79 is bored upwardly from bearing journal 80 to bearing journal 77 of gear case 3 so that the lubricating oil, which passed through oil passage 79, lubricates the front end portion of camshaft 1 journalled by bearing journal 77.

Branching oil passages 84 and 82 branch leftwards and rightwards from bearing journal 77 and are connected with respectively horizontal oil passages 83 and 81. When crankcase 2 and gear case 3 are jointed with each other, horizontal oil passages 83 and 81 are connected respectively with oil passages 86 and 93 bored through cylinder HL portion of crankcase 2. As shown in FIG. 22, oil passage 83 is connected to screw hole 79 into which a head bolt is screwed to fix cylinder head 29 onto crankcase 2. Screw hole 79 is to an oil passage 87 through a rocker arm shaft so that each of the rocker arms is lubricated.

Gear case 3 forms a pump mounting portion 3a for mounting cooling water pump 8 thereon at its upper left portion as seen from a front view, and forms a pump portion 3b constituting lubricating oil pump D.

Figure 32:
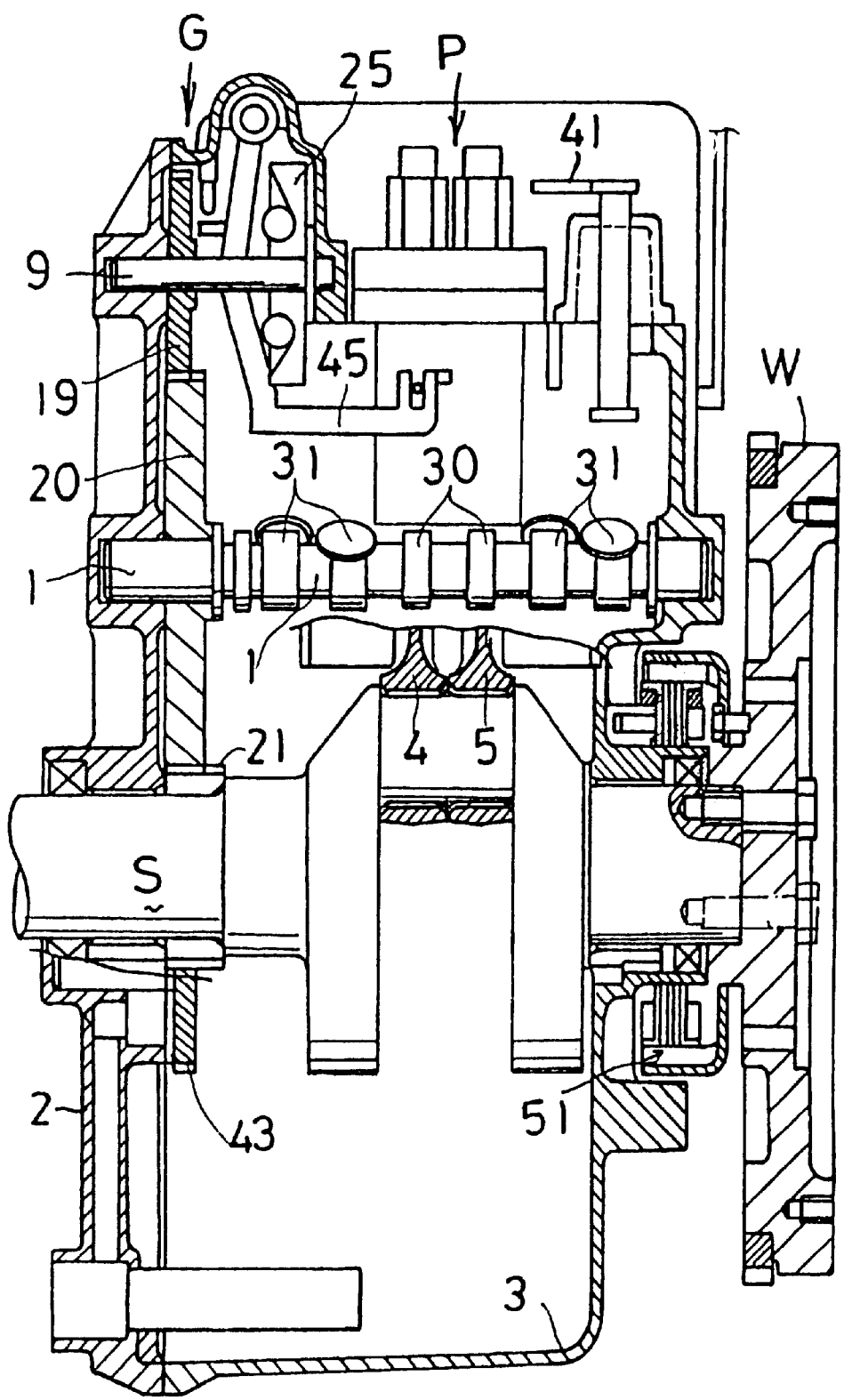
FIG. 32 is a cross-sectional right side view of a V type diesel engine of horizontal type, showing another embodiment of disposition of governor device G and fuel injection pump P.

In an embodiment shown in FIG. 32, fuel injection pump P is disposed between intake and exhaust cams 31 on the upper surface of crankcase 2. In this case, one pair of intake and exhaust cams 31 and the other pair thereof, which are both disposed on camshaft 1, are apart from each other longitudinally on camshaft 1. Fuel injection pump driving cams 30 are disposed on camshaft 1 between both pairs of intake and exhaust cams 31. Regulator lever 41 is supported on governor case A and disposed at the rear portion thereof.

Figure 33:
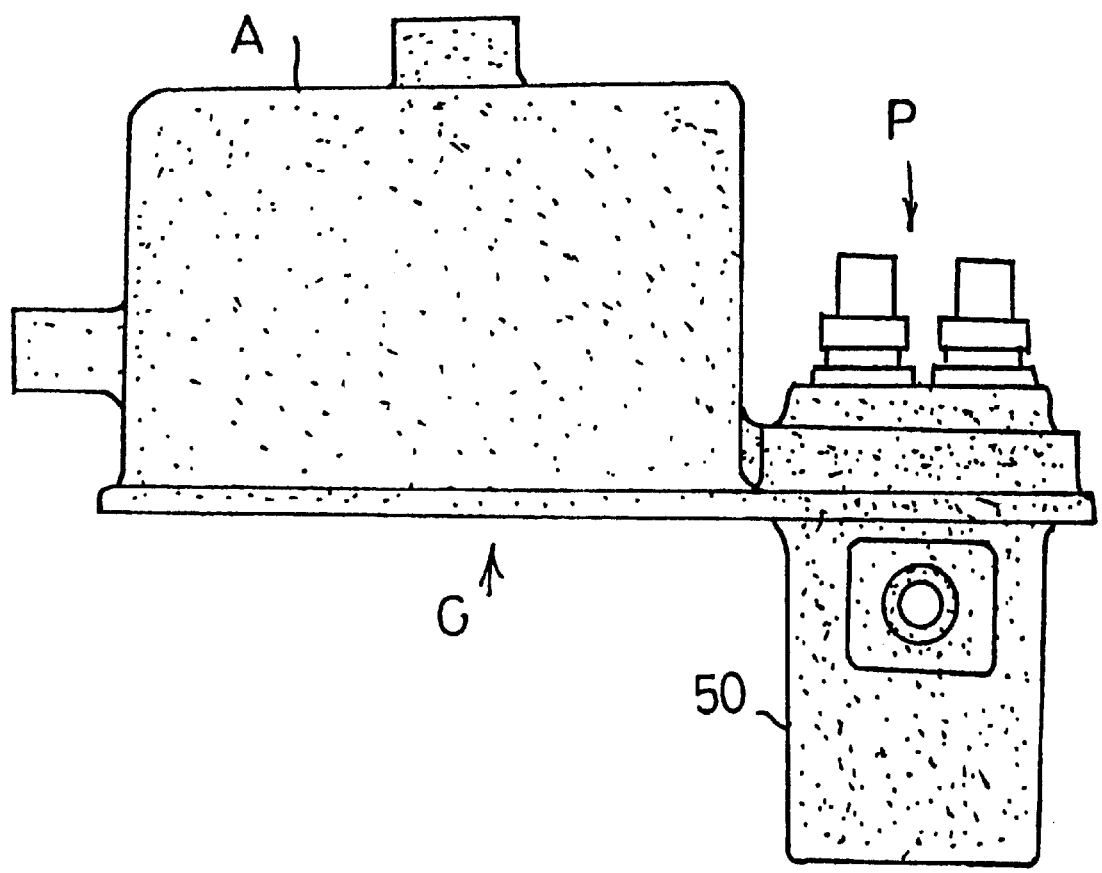
FIG. 33 is a side view of governor case A integrally forming a bracket to which fuel injection pump P is attached.

In an embodiment shown in FIG. 33, bracket 50, which is an extending portion of governor case A, is integrally formed as a part of fuel pump P while bracket 50 is formed apart from fuel pump P in the other embodiment.

Figure 18:
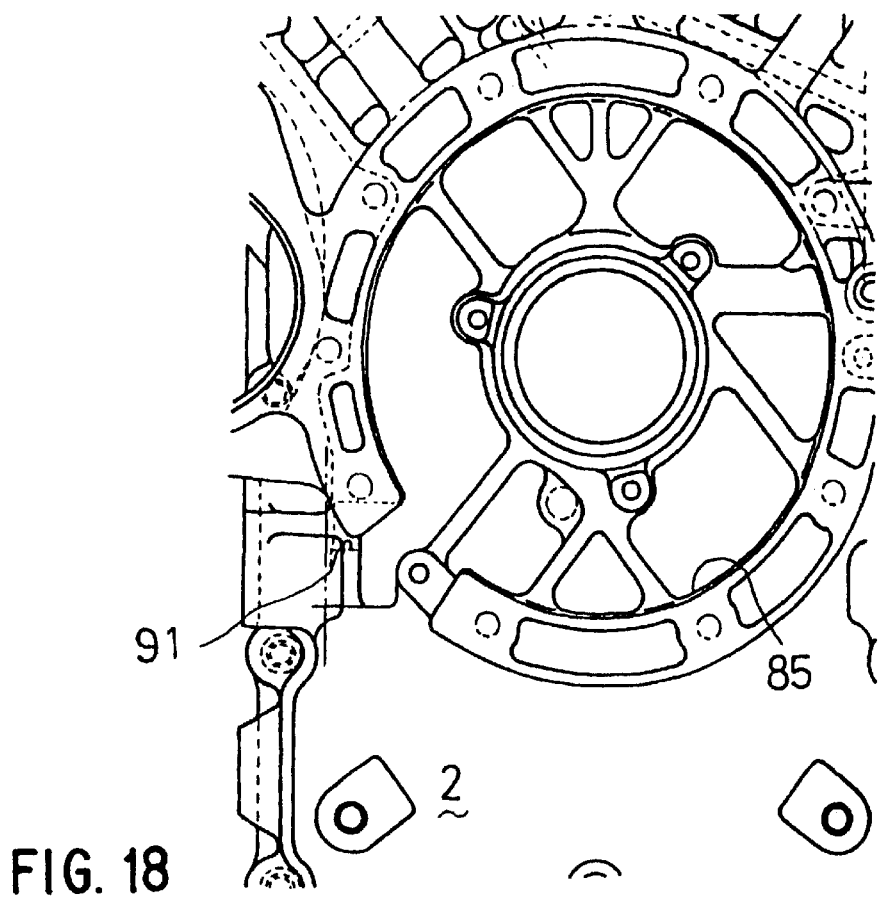
FIG. 18 is a rear view of the the crankcase of FIG. 13, showing dynamo housing space 85.
Figure 19:
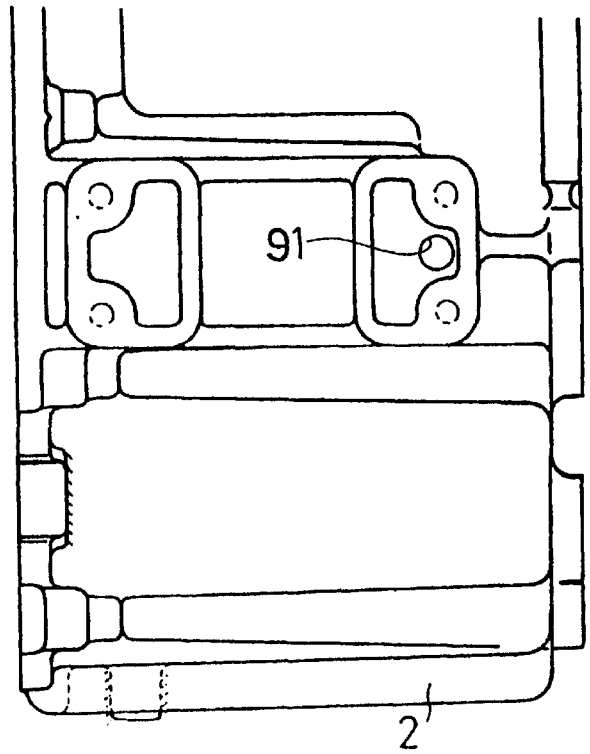
FIG. 19 is a side view of the the crankcase of FIG. 13, showing a drain hole 91 which is also used for a lead guide hole.
Figure 20:
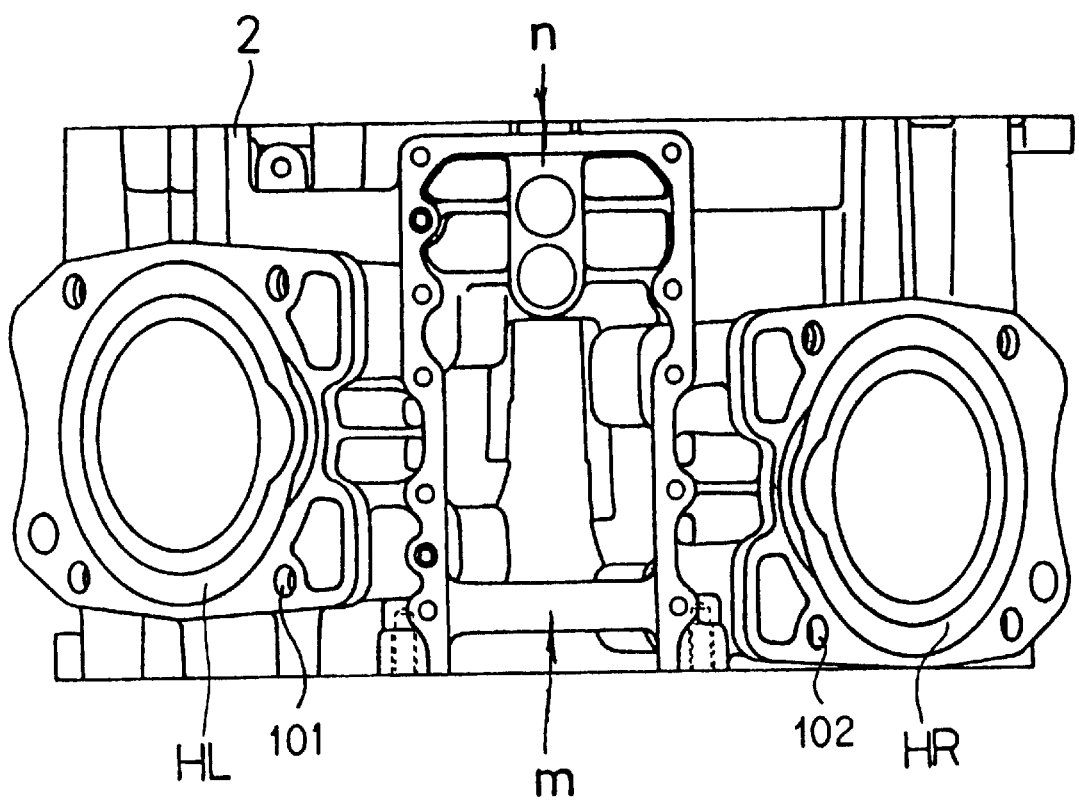
FIG. 20 is a plan view of the the crankcase of FIG. 13.
Figure 21:
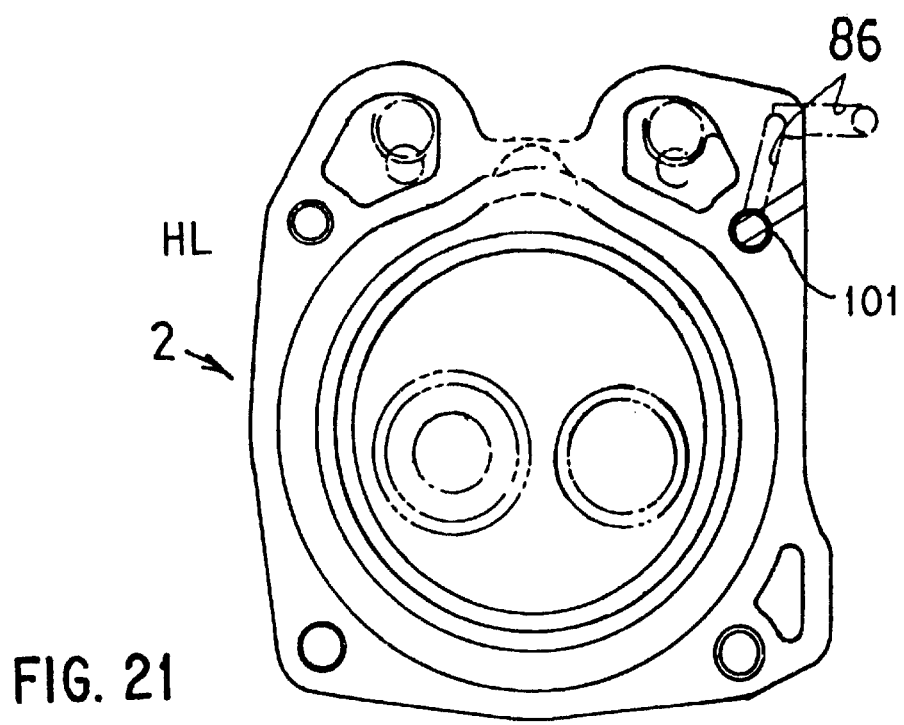
FIG. 21 is a plan view of cylinder HL or HR of crankcase 2.

FIGS. 18 and 19 show dynamo housing space 85 and a drain hole 91 which is also used for a hole for guiding a lead of dynamo D. In a vertical type engine, drain hole 91 is disposed at the lower portion of dynamo housing space 85.

In a V type diesel engine, camshaft 1, which is formed integrally with intake and exhaust cams 31 and fuel injection pump driving cams 30, is disposed between cylinders HL and HR. Dynamo housing space 85 is disposed on a closed side of crankshaft below camshaft 1.

In a V shaped space of crankcase 2 between cylinders HL and HR are disposed governor chamber m for housing governor device G and fuel injection pump chamber n for housing two fuel injection pumps P. The top of governor chamber m is covered with governor case A. Fuel injection pump chamber n is covered with bracket 50 projecting from governor case A so that two fuel injection pumps P are fixed to bracket 50.

Governor chamber m and fuel injection pump chamber n are formed by manner that molds are pulled out of crankcase 2 in a direction toward gear case 3 and in an upward direction toward a V bank, when crankcase 2 is die cast.

In the present invention, dynamo housing space 85 is formed by the space below fuel injection pump driving cams 30 on the same side with flywheel W of crankcase 2. Dynamo housing space 85 is inserted into the interior of crankcase 2 to prevent dynamo D therein from projecting out of crankcase 2.

A lead of dynamo D is required to be drawn outwardly from dynamo housing space 85. In the present invention, a lead guiding hole 91 is opened on a side of dynamo housing space 85. Lead guiding hole 91 is also used as a drain hole, so that a different drain hole from it is not required in dynamo housing space 85 of crankcase 2.

The V type diesel engine of the present invention can be used both as a vertical type engine which disposes crankshaft S vertically and as a horizontal type engine which disposes crankshaft S horizontally.

In the present invention, camshaft 1, governor device G and fuel injection pump P are specially disposed. Crankcase 2 and gear case 3 are compacted.

Furthermore, in recesses formed on sides of crankcase 2 are disposed starter k, supplement device n, fuel feed pump q, fuel filter 22, and lubricating oil filter L so that the entire v type diesel engine can be compact.

We claim:

1. A diesel engine of the type having cylinders disposed in a V shape, comprising:
    a single camshaft longitudinally disposed between said cylinders;
    intake and exhaust cams and fuel injection pump driving cams for driving a fuel injection pump, both being disposed on said camshaft;
    a crankshaft; and
    a governor device being disposed on a side opposite to said crankshaft of said camshaft.

2. A diesel engine according to claim 1, further comprising:
    a fuel injection pump disposed between said cylinders and on a side opposite to said crankshaft of said camshaft, such that said fuel injection pump and said governor device are longitudinally juxtaposed between said cylinders.

3. A diesel engine according to claim 1, further comprising:
    a governor case covering said governor device, said governor case including an extended portion; and
    a fuel injection pump attached to said extended portion of said governor case.

4. A diesel engine according to claim 1, further comprising:
    a governor case covering said governor device; and
    a fuel injection pump integrally formed by said governor case.

5. A diesel engine of the type having cylinders disposed in a V shape, comprising:
    a crankcase which is open at one of front and rear ends thereof, the cylinders being integrally formed therein;
    a gearcase engaging with an open one of said front and rear ends of said crankcase;
    a governor case engaging with said crankcase between said cylinders; and
    cylinder heads engaging with utmost ends of said cylinders;
    said crankcase, said gearcase, said governor case, and said cylinder heads constituting a main engine body.

6. A diesel engine according to claim 1, further comprising:
    a crankcase; and
    a governor chamber formed between said cylinders and connected with an interior of said crankcase, said governor device being disposed in said governor chamber.

7. A diesel engine according to claim 3, further comprising:
    a crankcase; and
    a fuel injection pump chamber formed between said cylinders and connected with an interior of said crankcase, said fuel injection pump being disposed in said fuel injection pump chamber.

8. A diesel engine according to claim 2, further comprising:
    a crankcase which is open at one of front and rear ends thereof;
    said governor device being disposed toward an open one of said front and rear ends of said crankcase between said cylinders; and
    said fuel injection pump being disposed toward a side of said crankcase opposite said open one.

9. A diesel engine according to claim 1, further comprising:
    a crankcase including lateral outer walls recessed laterally inward from outermost extended portions of said cylinders;
    a starter disposed on one of said lateral outer walls of said crankcase; and
    at least one supplementary device disposed on a remaining one of said lateral outer walls of said crankcase, wherein said starter and said at least one supplementary device extend laterally outward to an approximately equivalent lateral position as said outermost extended portions of said cylinders.

10. A diesel engine of the type having cylinders disposed in a V shape, comprising:
    a crankcase which is open at one of front and rear ends thereof, and which includes a closed end portion at a remaining one of said front and rear ends;
    a single camshaft longitudinally disposed between said cylinders;

intake and exhaust cams and fuel injection pump driving cams, both disposed on said camshaft;

a longitudinally disposed crankshaft; and a dynamo housing space formed within said closed end portion of said crankcase, wherein said dynamo housing space is disposed at a same side of said crankcase as said crankshaft of said camshaft.

11. A diesel engine according to claim 2, further comprising:

a fuel feed pump disposed on a side of one of said cylinders, and between said cylinders.

12. A diesel engine according to claim 2, further comprising:

fuel injection nozzles disposed between said cylinders for injecting fuel discharged from said fuel injection pump.

* * * * *